United States Patent [19]

Eyl et al.

[11] Patent Number: 4,985,873
[45] Date of Patent: Jan. 15, 1991

[54] METHOD AND APPARATUS FOR DETERMINING COMPRESSIONAL FIRST ARRIVAL TIMES FROM WAVEFORM THRESHOLD CROSSINGS PROVIDED BY APPARATUS DISPOSED IN A SONIC WELL TOOL

[75] Inventors: Kevin A. Eyl, Boulogne; Andrew L. Kurkjian, Saint Cloud, both of France; David J. Lineman, Houston, Tex.; Edward A. Pierce, Houston, Tex.; Joseph M. Steiner, Jr., Houston, Tex.

[73] Assignee: Schlumberger Technology Corporation, Houston, Tex.

[21] Appl. No.: 425,661

[22] Filed: Oct. 20, 1989

[51] Int. Cl.$^5$ .............................................. G01V 1/40
[52] U.S. Cl. ........................................ 367/27; 367/26; 367/34
[58] Field of Search ........................... 367/26, 27, 34; 340/858

[56] References Cited

U.S. PATENT DOCUMENTS

| | | | |
|---|---|---|---|
| Re. 26,297 | 11/1967 | Broding | 367/27 |
| 2,959,241 | 11/1960 | Kokesh | 181/102 |
| 3,048,102 | 8/1962 | Lebourg | 102/310 |
| 3,050,150 | 8/1962 | Tixier | 367/30 |
| 3,257,639 | 6/1966 | Kokesh | 367/27 |
| 3,275,095 | 9/1966 | Blizard | 367/27 |
| 3,292,729 | 12/1966 | Blizard | 367/27 |
| 3,304,536 | 2/1967 | Kokesh | 340/861 |
| 3,304,537 | 2/1967 | Schwartz | 367/27 |
| 3,390,377 | 6/1968 | Elliott et al. | 367/75 |
| 3,437,834 | 4/1969 | Schwartz | 307/360 |
| 3,860,759 | 1/1975 | Miller et al. | 367/26 |
| 3,900,824 | 8/1975 | Trouiller et al. | 367/34 |
| 3,900,826 | 8/1975 | Dowling et al. | 367/31 |
| 4,040,001 | 8/1977 | Vivet et al. | 367/26 |
| 4,042,907 | 8/1977 | Trouiller et al. | 367/26 |
| 4,172,250 | 10/1979 | Guignard | 367/27 |
| 4,210,965 | 7/1980 | Ingram | 367/26 |
| 4,210,966 | 7/1980 | Ingram | 367/27 |
| 4,223,398 | 9/1980 | Blalock | 367/34 |
| 4,320,470 | 3/1982 | Angehrn | 367/34 |
| 4,346,460 | 8/1982 | Schuster | 367/27 |
| 4,365,320 | 12/1982 | Beauducel et al. | 367/21 |
| 4,380,806 | 4/1983 | Waters et al. | 367/27 |
| 4,484,313 | 11/1984 | Dennis | 367/27 |
| 4,672,588 | 6/1987 | Willen | 367/28 |
| 4,683,556 | 7/1987 | Willis | 367/27 |
| 4,684,947 | 8/1987 | Zimmer | 340/858 |

Primary Examiner—Ian J. Lobo
Attorney, Agent, or Firm—Henry N. Garrana; John H. Bouchard

[57] ABSTRACT

A well logging system includes a digital threshold crossing data generation system (TCDG System) disposed in a well tool, adapted to be disposed in a borehole, and a digital first motion detection (DFMD) software disposed in a memory of a well truck computer. The TCDG system generates a series of threshold crossings for each analog signal received from a receiver of the well tool, the threshold crossings including a plurality of threshold crossing events for each analog signal and representing compressed versions of digitized analog waveforms. The well logging truck computer receives the threshold crossing data from the TCDG system and executes the DFMD software. When the software is executed, a first set of compressional wave first arrival times are determined from a startup routine in the software using the threshold crossing data. A second set of compressional wave first arrival times are determined from a tracking routine in the software using four different prediction methods and a voting procedure to select the second set of arrival times from among the four predictions. A cycle skip detection routine in the software determines if any cycle skips are associated with either the first or second set of compressional first arrival times. Finally, a cycle skip recovery routine determines which set of compressional first arrival times to select depending upon the outcome of the cycle skip detection routine.

15 Claims, 18 Drawing Sheets

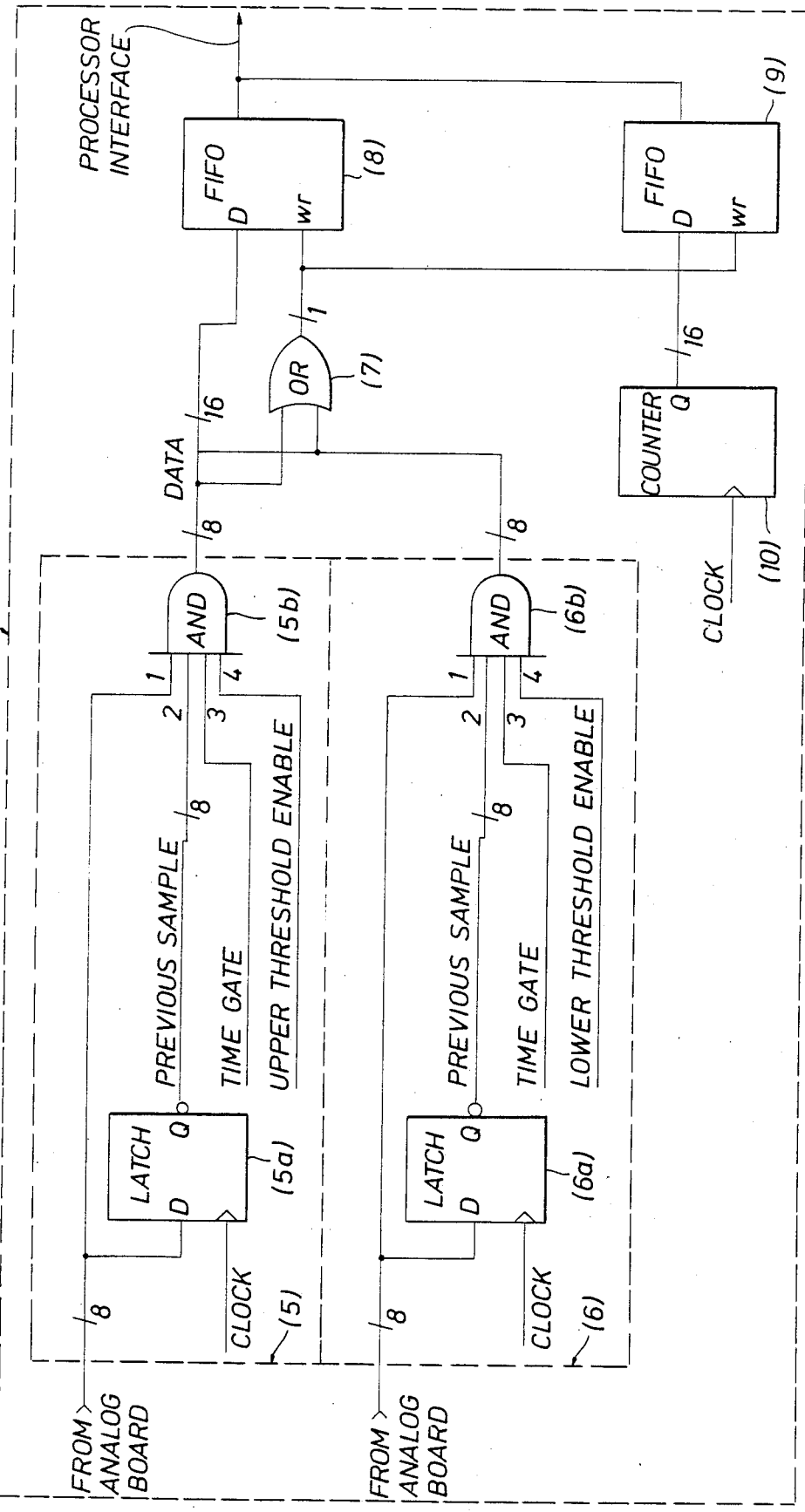

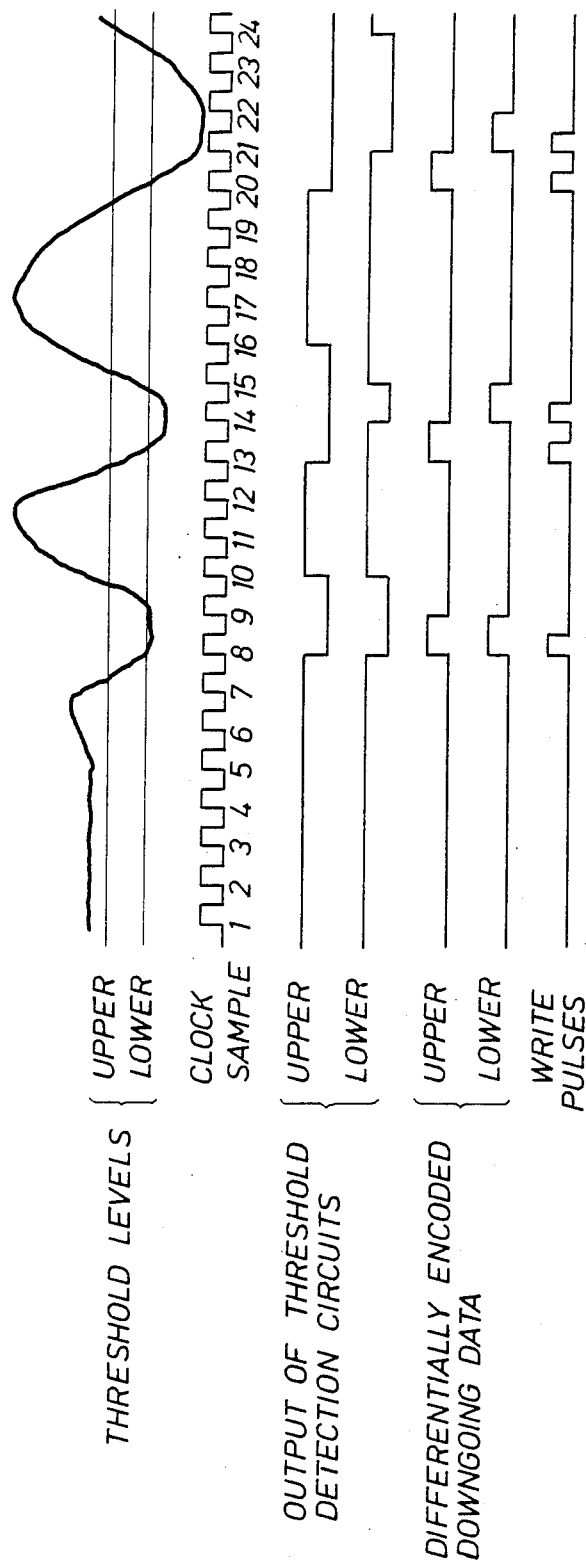

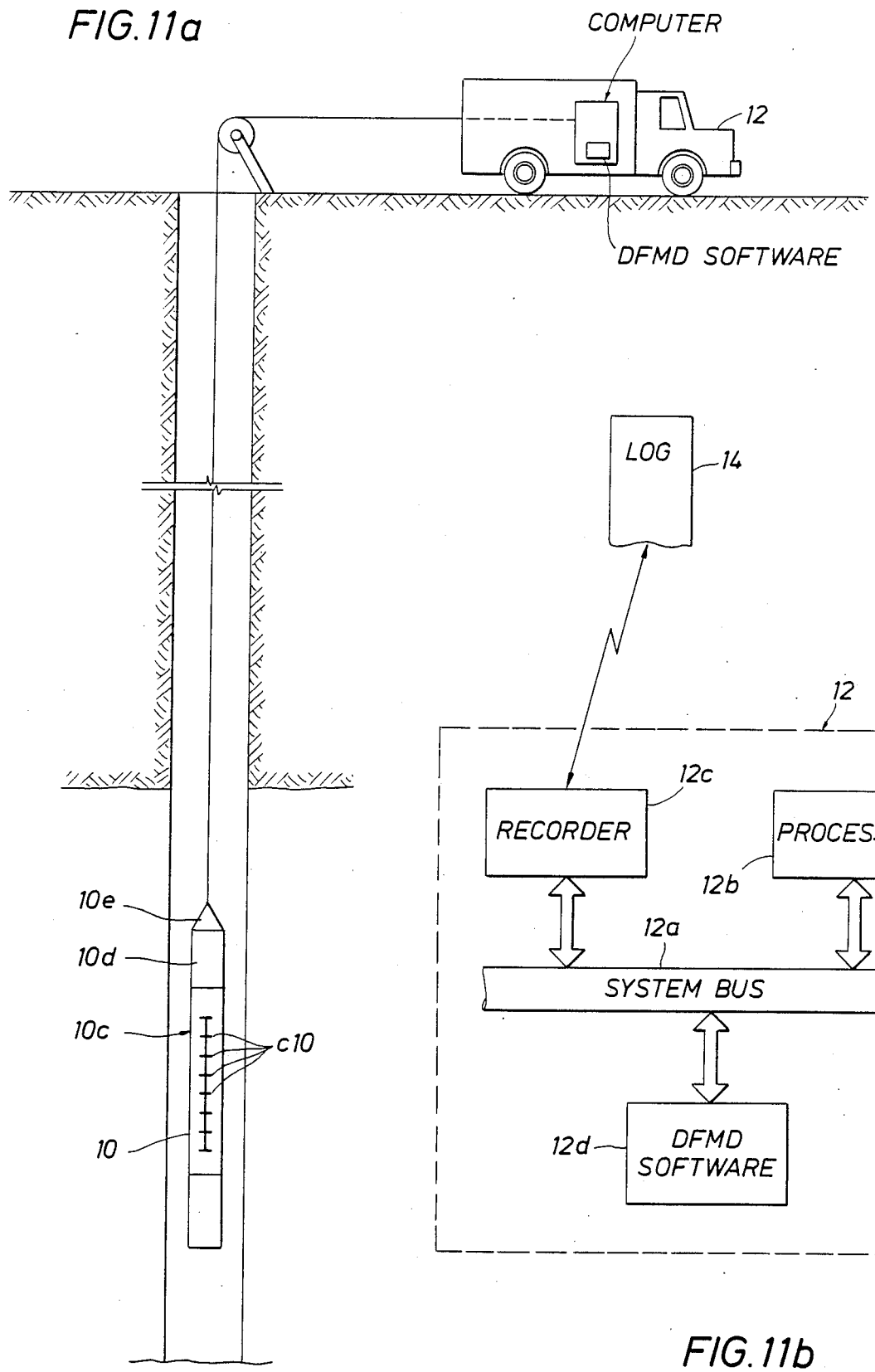

FIG. 20
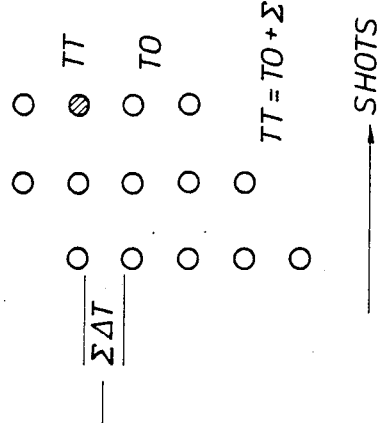
a) VDL (COMMON OFFSET) PREDICTION
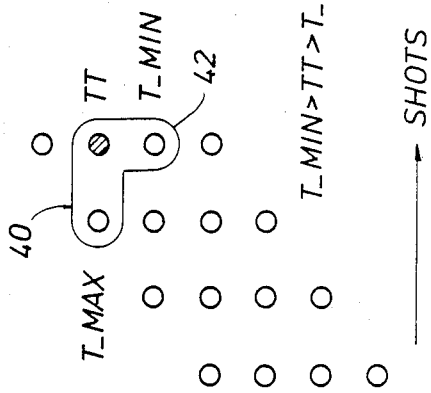
b) M.M.P. PREDICTION
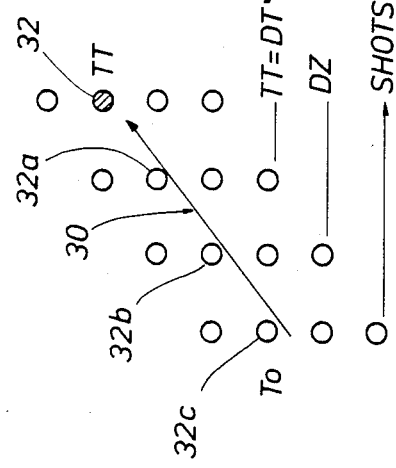
c) BEAM (COMMON SOURCE) PREDICTION
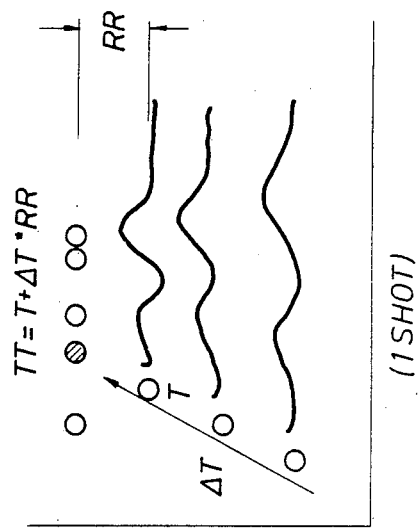
d) TIME RANGE PREDICTION

FIG. 21
| FIG. 21A | FIG. 21B |
FIG. 21A
FIG. 21B
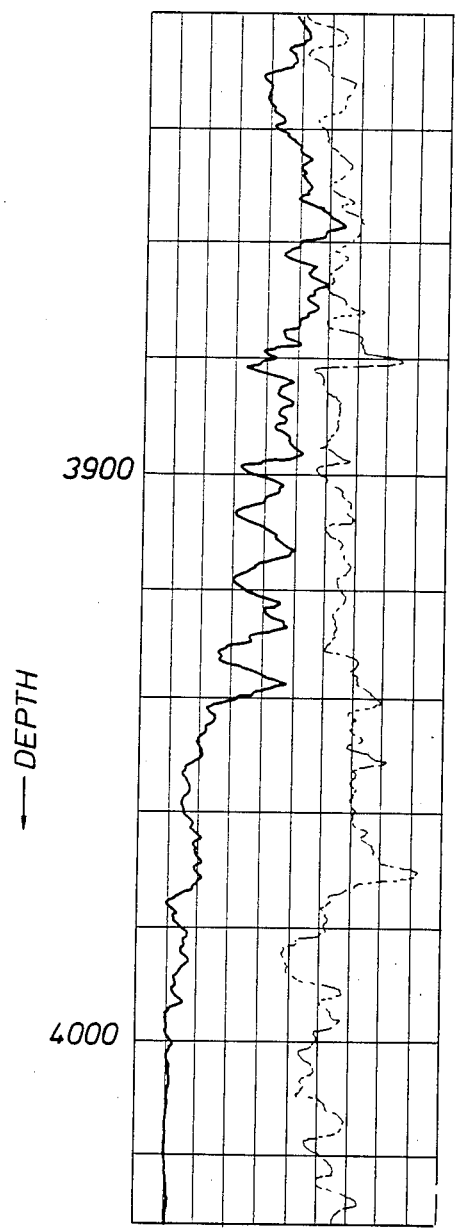
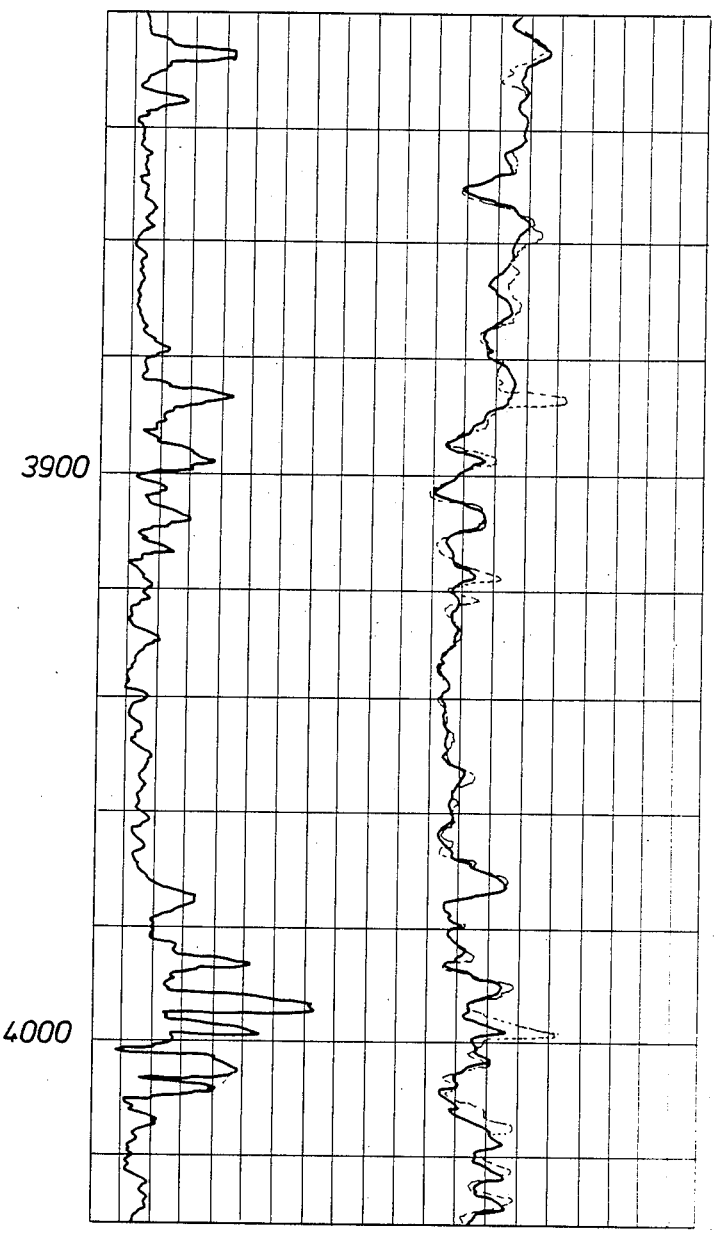
| GR | |
|---|---|
| 20.00 | 120.00 |
| HD | |
| 6.00 | 16.00 |
| DFMD.ERR26 | | STC.DTCO26 | |
|---|---|---|---|
| 0.00 | 2.50 | 160.00 | 60.00 |
| | | DFMD.DT26 | |
| | | 160.00 | 60.00 |

METHOD AND APPARATUS FOR DETERMINING COMPRESSIONAL FIRST ARRIVAL TIMES FROM WAVEFORM THRESHOLD CROSSINGS PROVIDED BY APPARATUS DISPOSED IN A SONIC WELL TOOL

BACKGROUND OF THE INVENTION

The subject matter of the present invention pertains to digital first motion detection associated with compressional waves in array sonic data, and more particularly, to a method and apparatus for generating threshold crossings from each analog waveform generated by a receiver in an array sonic service tool and for determining the first arrival time of a compressional wave at each such receiver thereby determining a borehole formation property adjacent a plurality of the receivers.

Well tools are adapted to be lowered into boreholes for the purpose of generating data representative of the characteristics of an earth formation in the borehole. One such well tool is a sonic tool, a tool that pulses the formation with dipole and/or monopole "pressure waves" thereby inducing shear waves and compressional waves in the formation, the shear and compressional waves propagating up the formation from the tool pulse source transmitter to a plurality of tool receivers. If one could sense the first arrival time of a compressional wave at each receiver, a time difference "delta-T" could be determined associated with the propagation time of the compressional wave between adjacent receivers, the delta-T being representative of the properties of the formation (e.g., compressional wave slowness) between the adjacent receivers One prior art sonic tool owned by the assignee of this patent is called the "Array Sonic Service" tool, or the "Sonic Digitizing Tool" (SDT). The SDT tool operated in two modes: the digital mode and the analog mode. In both modes, the SDT attempted to determine the first arrival time of compressional waves at each receiver almost entirely within the confines of the well logging truck computer located at the well surface. During the digital mode, analog data, representing first arrival time data, was first digitized and the digitized analog data was transmitted uphole to a well truck computer. The digitized analog data was processed entirely by the well logging truck computer software. From a design standpoint, it is preferable to design a telemetry system utilizing digital circuitry as opposed to analog circuitry. Although the analog data was digitized, the quantity of such digitized analog data required complicated and expensive digital telemetry circuits for transmitting the digitized analog data uphole. During the analog mode, the analog data was transmitted uphole to the well truck computer; however, it was contaminated with ambient noise during its transmission uphole. It was necessary to account for the presence of this noise during the processing by the truck computer. In addition, the SDT was limited to one detection per threshold; using this implementation, a detection on noise results in an incorrect travel time reading. A more desirable approach to compressional wave first motion detection is to first generate, within the well tool, a reduced or compressed quantity of data for transmission uphole, relative to the digitized analog data generated by the SDT tool. The compressed data should be free of ambient noise. In the context of this discussion, this compressed quantity of data is termed digital threshold crossing or zero crossing data. Using this more desirable approach, the digital threshold crossing data would be transmitted uphole, via a digital telemetry system, to a well logging truck computer; and, using a special first motion detection software embodied in the truck computer memory, a set of first arrival times would be determined, associated with a compressional wave propagating in a surrounding formation, a first arrival time being determined for each receiver. The first arrival times, for each receiver, further determine compressional wave slowness between adjacent receivers in the surrounding formation and ultimately the characteristics or properties of the surrounding earth formation in the vicinity of the receivers within the borehole.

SUMMARY OF THE INVENTION

Accordingly, it is a primary object of the present invention to design and provide a system for determining the first arrival time of compressional waves at each receiver of a sonic service tool, wherein a portion of the system is disposed downhole, in the well tool, thereby implementing a portion of the compressional wave first arrival time determination procedure downhole in the well tool.

It is another object of the present invention to produce downhole in the well tool a multiple number of detections per threshold thereby further producing, uphole in the well logging truck, a correct compressional wave travel time reading in spite of the ambient noise present during the uphole transmission.

It is a further object of the present invention to design and provide a system for determining the first arrival time of compressional waves at each receiver of a sonic well tool, which system includes a zero or threshold crossing digital data generation system, disposed downhole in a well tool, for generating digital threshold crossing data to be transmitted uphole via a digital telemetry system in response to analog waveform data, the digital threshold crossing data being compressed in terms of quantity relative to prior art digitized analog data, and a digital first motion detection processing system, disposed in a well logging truck computer at a well surface, and responsive to the threshold crossing digital data, for generating first arrival time data associated with a propagation of compressional waves within a formation of the borehole.

It is a further object of the present invention to design and provide a new system for determining a first arrival time of a compressional wave at a receiver of a sonic service tool, which system includes a zero or threshold crossing determination system, disposed in the well tool, for determining zero or threshold crossings of an analog wave received from a sonic receiver, and a first motion detection system, disposed in a well logging truck computer at the well surface, and responsive to the zero or threshold crossing data determined by the zero or threshold crossing determination system, for determining the first arrival time of the compressional wave at each of the receivers of the sonic tool from the zero or threshold crossing data, the first arrival time data being determined simultaneously for each receiver of the sonic tool, the first arrival time data for each receiver further determining the time elapsed during propagation of the compressional wave between adjacent receivers, the time elapsed being representative of the slowness of compressional waves propagating in the formation and thereby the characteristics of the formation surrounding the receivers.

These and other objects of the present invention are accomplished by designing and providing a system which includes a zero or threshold crossing determination means disposed in the well tool adapted to be used downhole and a first motion detection means disposed in a well logging truck computer at the well surface. The threshold crossing determination means disposed in the well tool comprises an analog board connected to each well tool receiver and a digital board connected to the analog board for providing threshold crossing data to the well logging truck computer. The analog board receives the analog waveforms from each receiver, and, for a particular receiver, generates a series of two-bit digital codes which represent threshold crossings, during a corresponding series of sampling intervals, across two thresholds. The digital board compares each two sequentially generated sets of two-bit digital codes and, using a special algorithm, generates one two-bit digital code for the particular receiver. Other two-bit digital codes, for the other receivers, are also generated by the digital board to produce a 16-bit (for 8 receivers) word containing 1's and 0's, the 1's representing the threshold or zero crossing data. The 16-bit word is received by the well logging truck computer, and a body of software, stored in the well logging truck computer memory, termed the "DFMD software", is executed by the processor of the computer, instruction by instruction, for determining the first arrival time of the compressional wave at each of the well tool receivers. When the first arrival time at each receiver is determined, a time difference is determined for each set of adjacent receivers representing the time elapsed during propagation of the compressional wave between each set of adjacent receivers. This time difference for each set of adjacent receivers further enables one to determine the properties of the borehole formation surrounding the receivers.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinafter, and the accompanying drawings, which are given by way of illustration only and are not intended to be limitative of the present invention, and wherein:

FIG. 6, including

FIG. 7, including

FIGS. 9A and 9B illustrate a construction of the digital board of FIG. 7b;

FIGS. 10A and 10B are timing diagrams associated with the digital board of FIG. 7b;

FIG. 11a illustrates the sonic well tool disposed in a borehole and connected to a well logging truck computer at the well surface, the computer storing the Digital First Motion Detection (DFMD) software in accordance with a second part of the present invention;

FIG. 11b illustrates a more detailed construction of the well logging truck computer of FIG. 11a;

FIGS. 13-17b illustrate flowcharts representing a detailed construction of the DFMD software shown in FIG. 12;

FIGS. 18-20 assist is providing a functional description of the operation of the DFMD software when executed by the well logging truck computer, and in particular, FIG. 18 is a sketch of a plurality of analog waveforms received from a corresponding plurality of receivers, FIG. 19 is a sketch of depth versus number of measurements with time;

FIG. 20 illustrate sketches for predicting, using a plurality of prediction methods, a zero crossing associated with a second receiver analog waveform given a zero crossing associated with a first receiver analog waveform; and FIGS. 21a and 21b illustrate logs of compressional wave slowness associated with the borehole in which the well tool is disposed calculated using the DFMD software in accordance with the second part of the present invention.

DETAILED DESCRIPTION OF THE PREFERRED EMBODIMENT

Figure 1A:
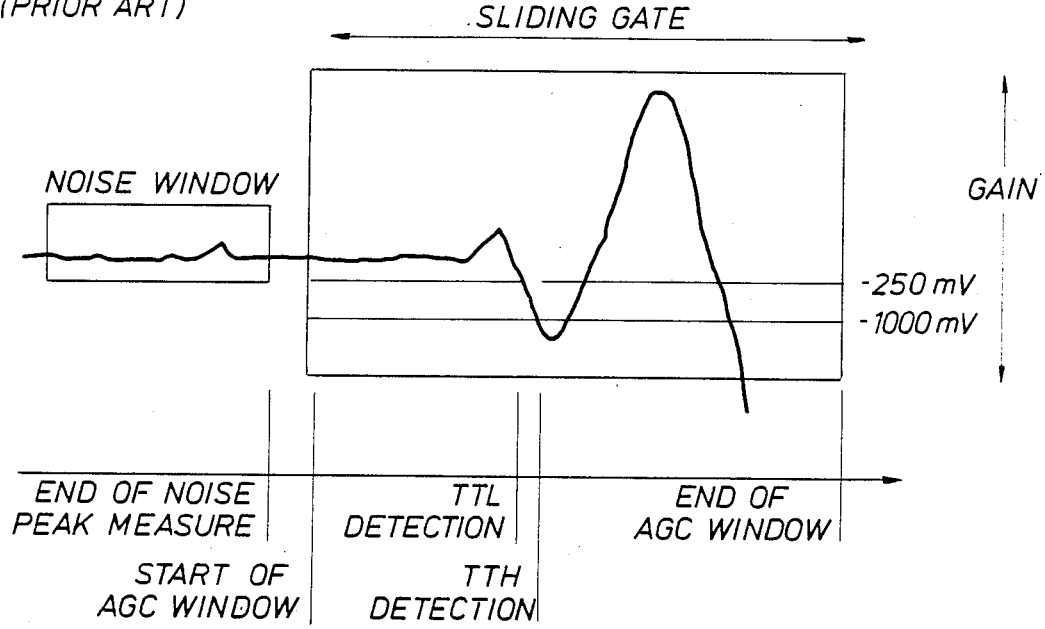
FIGS. 1a, 16(a,) 16(a,) and 16(c) illustrate a prior art technique used by the assignee of this patent for determining the first arrival times associated with compressional waves propagating in a borehole formation.
Figure 1B:
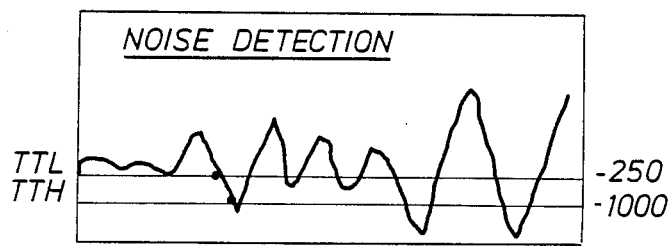
Figure 1B:
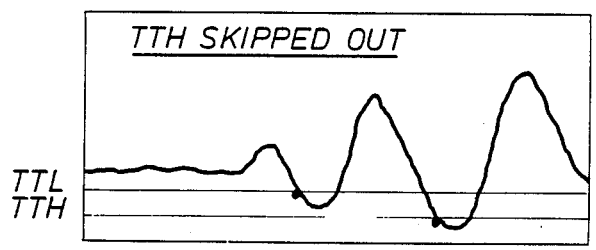
Figure 1B:
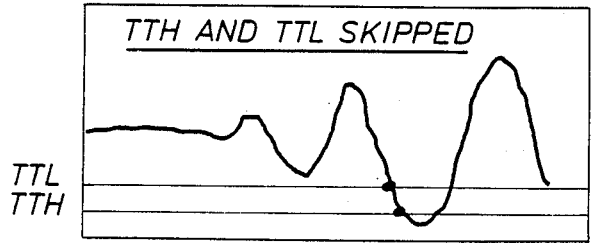

Referring to FIG. 1, including FIGS. 1a and 1b, a description of the functional operation of the prior art Sonic Digitizing Tool (SDT), referenced in the Background section of this specification, is illustrated. The SDT tool uses a Sonic Telemetry transmitter hardware, termed the Sonic Digitizing Cartridge, to transmit the analog waveform data from the tool to the well truck computer, and software, embodied in the well logging truck computer memory, to perform dual threshold detection controlled by gain and sliding gate parameters and to perform cycle skip recovery which detects when noise or cycle skips corrupt the legitimate first motion, first arrival threshold detection.

FIG. 1a is a diagram of the analog threshold detection for a single receiver. All receivers are controlled independently by a processor but use the same detection logic. The system attempts to measure the arrival time and amplitude of the negative peak (E2) of the compressional within a given window, called the sliding gate. The time dimension of the sliding gate, including its starting time, duration, and moveout across a receiver array, can be controlled by commands from the processor. The vertical dimension of the window, or the amplitude, is measured in millivolts and can also be controlled by the processor. The system makes two threshold detections within this window, a low one at $-250$ millivolts and a high one at $-1000$ millivolts. In certain modes, the negative peak amplitude near the threshold detection also is measured and recorded as the sonic amplitude. In addition to the sliding gate, there is another window which starts and ends before the sliding gate and measures the noise peak amplitude. The system records the highest positive peak value in the noise window in millivolts. Once the hardware has acquired all of this information, the cycle skip logic determines what steps are necessary to acquire the correct travel time. The cycle skip recovery logic uses the acquired high and low threshold crossing times, as well as the noise peak measurement, to decide if the hardware is detecting the correct arrival. If the detection seems to be cycle skipping, the recovery logic sends commands to adjust the gain and the sliding gate for correct detection on the next firing. The prior art SDT tool tests the detected threshold crossing times by determining how close the crossing times are to times picked on previous firings for the same receiver.

FIG. 1b illustrates some possible situations which would cause a bad detection, in the prior art SDT tool, and the corresponding parameter changes that would be required to correct the bad detection. FIG. 1b(a) shows what happens when noise plagues the detection. Both high and low threshold times appear on the same peak, but the noise peak amplitude reads above 1000 millivolts. The cycle skip logic determines that detection is locked on noise, and the low threshold time is probably wrong. The SDT uses only the high threshold time, reduces the gain, and resets the sliding gate parameters to attempt to regain control of the acquisition. FIG. 1b(b) illustrates a cycle skipped detection on one threshold. FIG. 1b(c) illustrates a detection where both high and low thresholds are detecting on a later cycle.

Figures 2, 3:
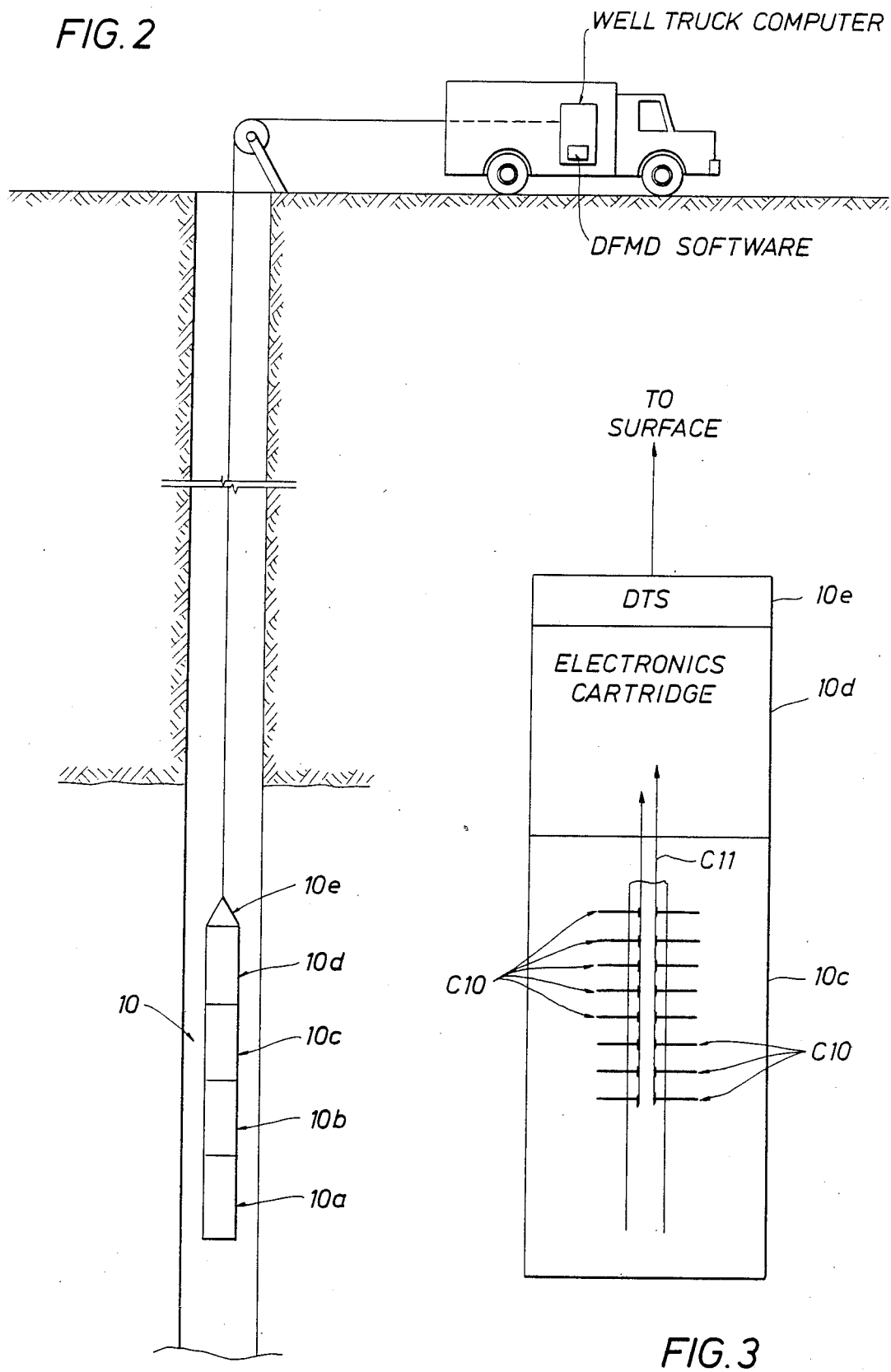
FIG. 2 illustrates a sonic tool disposed in a borehole and connected to a well logging truck containing a computer, the computer storing the Digital First Motion Detection (DFMD)
FIG. 3 illustrates the receiver section connected to the electronics cartridge section of the sonic tool shown in FIG. 2, the electronics cartridge containing the zero or threshold crossing determination system portion of the present invention.

Referring to FIG. 2, in accordance with the present invention, a well logging truck is shown lowering a sonic well tool into a borehole, the well tool including a transmitter 10a, a sonic isolation joint or attenuation member 10b, a receiver 10c, an electronics cartridge 10d, and a digital telemetry system (DTS) 10e. The truck contains a computer, the computer having a memory which stores a body of software in accordance with one portion of the present invention, the software being termed a Digital First Motion Detection (DFMD) software (hereinafter termed "DFMD software"). The well truck computer, including the DFMD software, will hereinafter be termed the "First Motion Detection Processing System", or the "FMDP system", which system functions to determine the first arrival time of a compressional wave, propagating in a borehole formation, at each receiver of the sonic tool shown in FIG. 2. The FMDP system in the well logging truck determines the first arrival times of the compressional waves at each receiver 10c of the well tool shown in FIG. 2 in response to digital threshold crossing data generated by a "Digital Threshold Crossing Data Generation System" disposed in a well tool 10 (hereinafter termed the "TCDG system") in accordance with another portion of the present invention. The TCDG system disposed in the well tool 10 is embodied in the electronics cartridge 10d of the well tool 10.

Referring to FIG. 3, a further construction of the receiver 10c, connected to the electronics cartridge 10d, is illustrated. Receiver 10c comprises an array of hydrophones (or hydrophone array), the hydrophone array in the preferred embodiment including eight (8) hydrophone sets C10. Each hydrophone set C10 is connected to a set of wires which are connected to the electronics cartridge 10d. When sonic compressional waves are detected by each hydrophone set C10, a signal is transmitted, via the wires, to the electronics cartridge 10d. The cartridge 10d contains the circuitry for generating the digital zero or threshold crossing data for transmission to the well surface, via the Digital Telemetry System (DTS) 10e.

Figure 4:
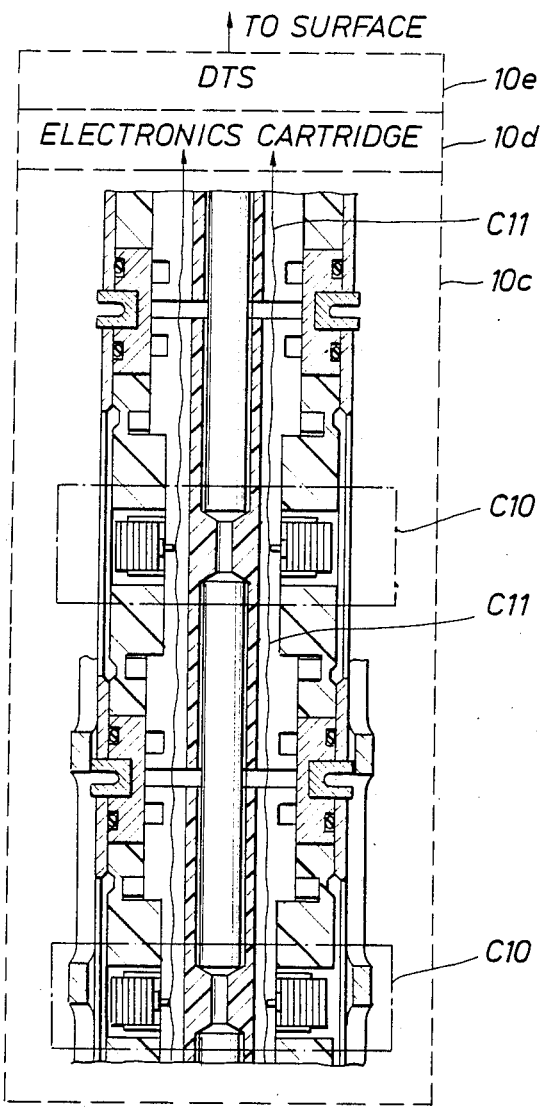
FIG. 4 illustrates a more detailed construction of a portion of the receiver section of FIG. 3.

Referring to FIG. 4, a more detailed construction of the receiver 10c is illustrated. The receiver 10c is discussed in detail in prior pending application Ser. No. 325,405, filed Mar. 17, 1989, entitled "A Sonic Well Tool Transmitter and Receiver Array including an Attenuation and Delay Apparatus", the disclosure of which is incorporated by reference into this specification. In FIG. 4, each hydrophone set C10 includes, in cross-section, at least two and preferably four hydrophones, each hydrophone being disposed opposite a twin hydrophone in the cross-section. A wire conductor C11 is connected to each hydrophone of the hydrophone set C10 for conducting an electrical signal to the electronics cartridge 10d. The electrical signal is a compressional wave analog signal representing the compressional wave propagating up the formation of the borehole between the transmitter 10a and the receiver 10c. As mentioned above, the electronics cartridge 10d converts the analog signal into zero or threshold crossing digital data, and the digital telemetry system (DTS) 10e transmits this digital data to the well logging truck computer at the well surface.

Figure 5:
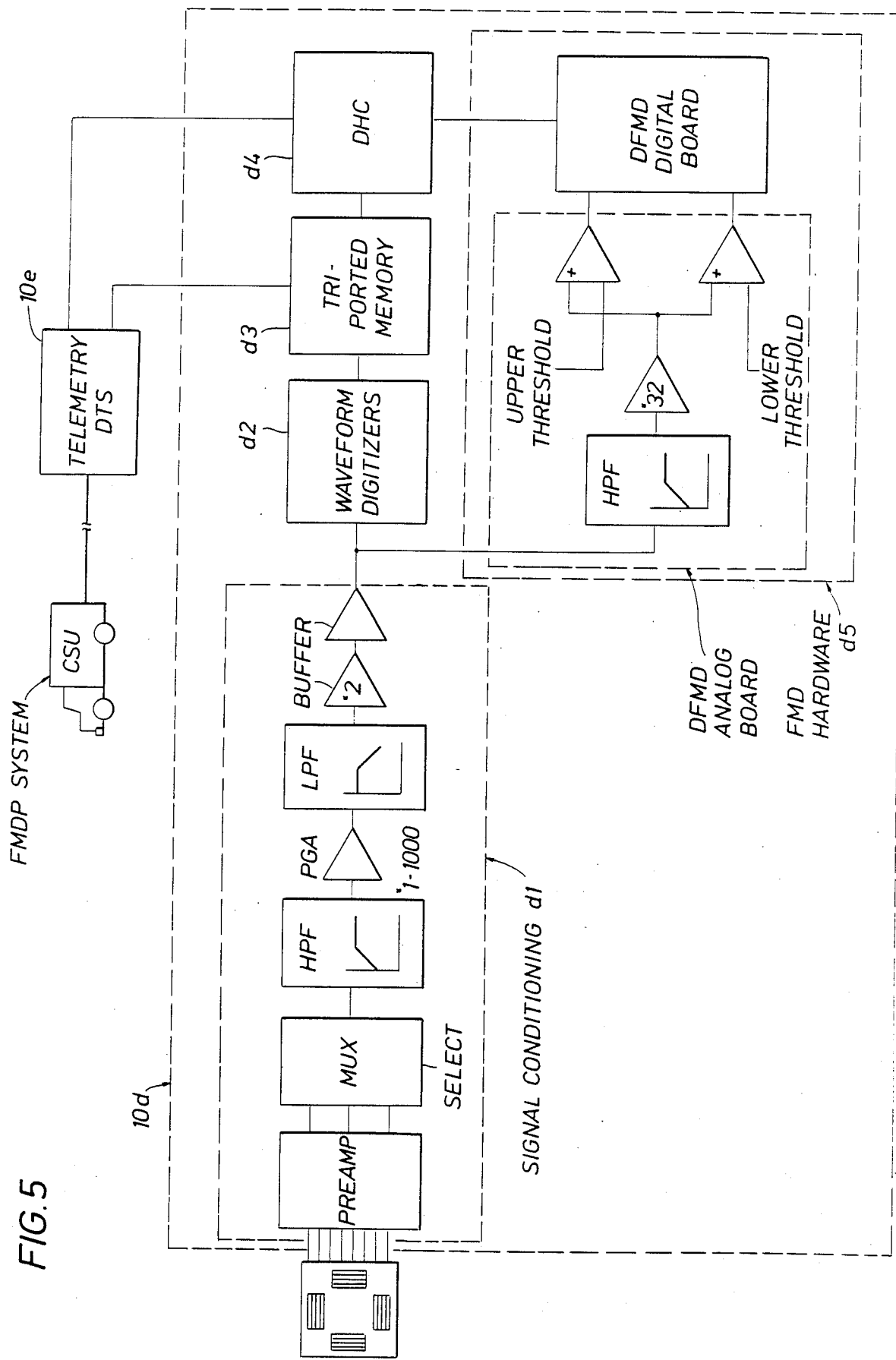
FIG. 5 illustrates a Digital Threshold Crossing Data Generation System, in accordance with a first part of the present invention, disposed in the electronics cartridge of a well tool, connected to a First Motion Detection Processing System, in accordance with a second part of the present invention, disposed in a computer located in a well logging truck at the well site.

Referring to FIG. 5, an overall block diagram of a Digital Threshold Crossing Data Generation System, in accordance with a first part of the present invention, disposed in the electronics cartridge 10d of a well tool 10, and connected to a First Motion Detection Processing System, in accordance with a second part of the present invention, disposed in a computer located in a well logging truck at the well site, is illustrated.

In FIG. 5, the cartridge 10d includes a signal conditioning unit d1 connected to each of the hydrophone sets C10 of the receiver 10c, which unit includes a pre-amp, a multiplexer (MUX), a high pass filter (HPF), a programmable gain amplifier (PGA), a low pass filter (LPF), and two serially connected buffers. The signal conditioning unit d1 filters and amplifies the analog signals received from the receiver 10c and transmits the filtered and amplified signals to a waveform digitizer d1, otherwise termed an analog to digital (A to D) converter d2. The converter d2 digitizes the analog signals. The digital signals are stored in a tri-ported memory (TPM) d3, and a downhole controller (DHC) d4 accesses the digital signals stored in the tri-ported memory d3 for transmission to the First Motion Detection Processing System (FMDP System) in the well logging truck at the well surface, via the digital telemetry system (DTS) 10e. Recall that the FMDP system, located in the well logging truck, comprises the computer and the Digital First Motion Detection (DFMD) Software stored in the computer memory. In addition, the analog signals from the signal conditioning unit d1 are input to a First Motion Detection (FMD) hardware d5, which FMD hardware d5 determines threshold crossing times where the received analog waveform signals cross a particular, predetermined threshold in accordance a first aspect of the present invention. As noted in FIG. 5, the FMD hardware d5 comprises an analog board and a digital board. The analog board includes a high pass filter (HPF) and a threshold detection logic. The digital board includes a high speed first-in first-out memory and a gating control. The analog and digital boards will be discussed in more detail later in this specification. When the analog waveforms are compressed and reduced to a series of threshold crossings by the FMD hardware d5, the threshold crossing data is acquired by the DHC d4, transmitted uphole via the DTS 10e, and stored in the well logging truck computer memory of the FMDP system. The threshold crossing data is loaded from the well logging truck computer memory into the computer processor where the Digital First Motion Detection (DFMD) software, in accordance with a second aspect of the present invention, computes the arrival times of compressional waves received by each of the hydrophone sets C10 of receiver 10c. When the arrival times are calculated, a separate algorithm computes compressional wave slowness from the arrival time data. The compressional wave slowness data is plotted on a log, and the log is given to a customer for his further analysis in order to further determine if oil exists in the surrounding earth formation in the borehole. A typical log, given to a customer, reflecting compressional wave slowness data, is illustrated in FIG. 21 of the drawings.

A detailed discussion of the Digital Threshold Crossing Data Generation System (TCDG system), disposed in the electronics cartridge 10d of well tool 10 shown in FIG. 2, will be set forth in the following paragraphs.

Figure 6A:
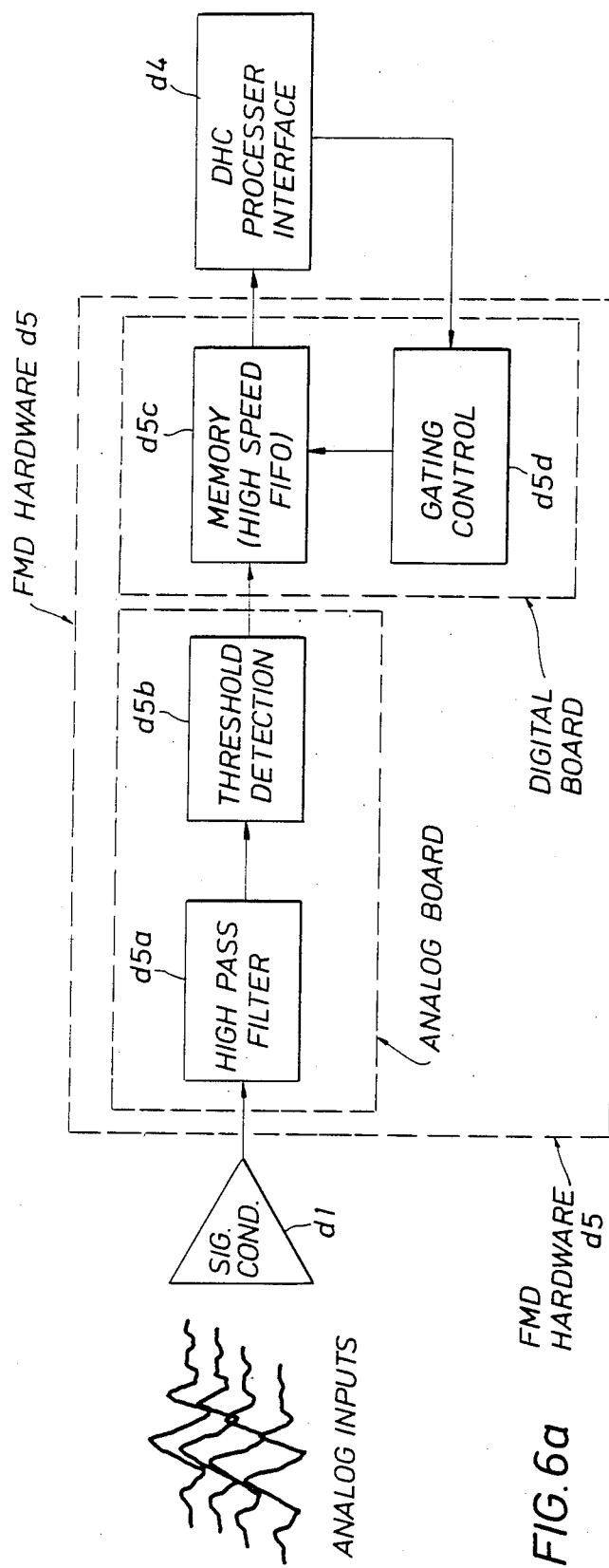
FIGS. 6a and 6b, illustrates a block diagram of the First Motion Detection (FMD) hardware shown in FIG. 5.
Figure 6B:
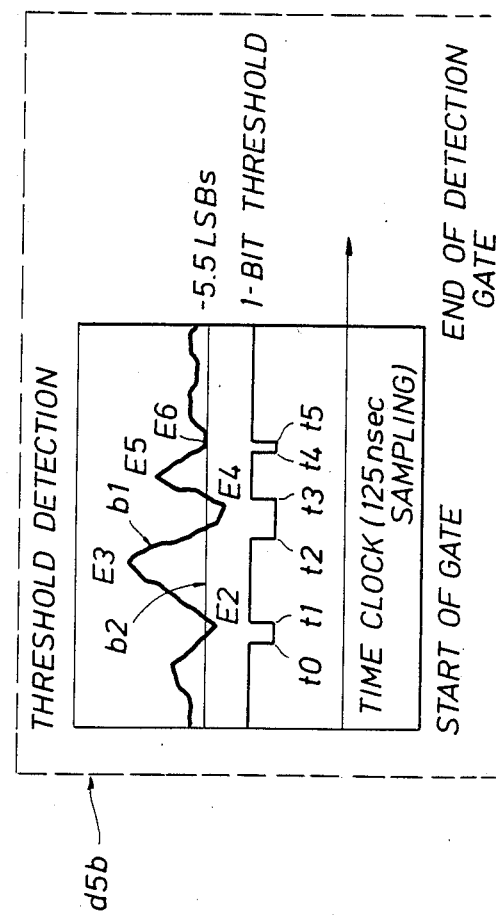

Referring to FIG. 6a, a block diagram of the FMD Hardware d5 shown in FIG. 5 is illustrated. In FIG. 6, FMD hardware d5 includes an analog board, which analog board further includes a high pass filter d5a connected on one side to the signal conditioning unit d1 and, on the other side, to a threshold detection circuit d5b the threshold detection circuit d5b being connected to a digital board, which digital board further includes a first-in first-out (FIFO) high speed memory d5c, and a gating control d5d connected to the memory d5c. The memory d5c is connected to the downhole controller (DHC) interface d4. The threshold detection circuit d5b detects the times when the analog waveform crosses a threshold. For example, referring to FIG. 6b, the threshold detection circuit d5b detects when the analog waveform b1, representing an output analog waveform originating from a typical hydrophone set C10 of receiver 10c, crosses a threshold b2. The threshold detection circuit d5b performs this detection function by sampling the waveform b1 at a plurality of sampling intervals along the time axis, each sampling interval being approximately 125 nano-seconds. At point E2, waveform b1 crosses threshold b2 in two places on a time axis, at time t0 and at time t1. The circuit d5b detects this threshold crossing during a particular sampling interval, and a downgoing pulse is created, beginning at time t0 and ending at time t1. At point E4, the waveform b1 again crosses threshold b2 in two places on the time axis, at time t2 and at time t3. Circuit d5b detects this crossing during another sampling interval, and another downgoing pulse is created, beginning at time t2 and ending at time t3. At point E6, the waveform again crosses threshold b2 in two places on the time axis, at time t4 and at time t5. Threshold Detection Circuit d5b detects this further crossing during a still another sampling interval, and another downgoing pulse is created, beginning at time t4 and ending at time t5. The threshold detection circuit d5b detects the downgoing portion of each pulse and labels the downgoing portion of each pulse as a threshold crossing. Therefore, in our example, times t0, t2, and t4 are the threshold crossings detected by the threshold detection circuit d5b. These threshold crossings (t0, t2, t4) are latched into memory d5c by gating control d5d, and DHC d4 retrieves this crossing data for transmission uphole to the FMDP system in the well logging truck via the DTS 10e.

Figure 7A:
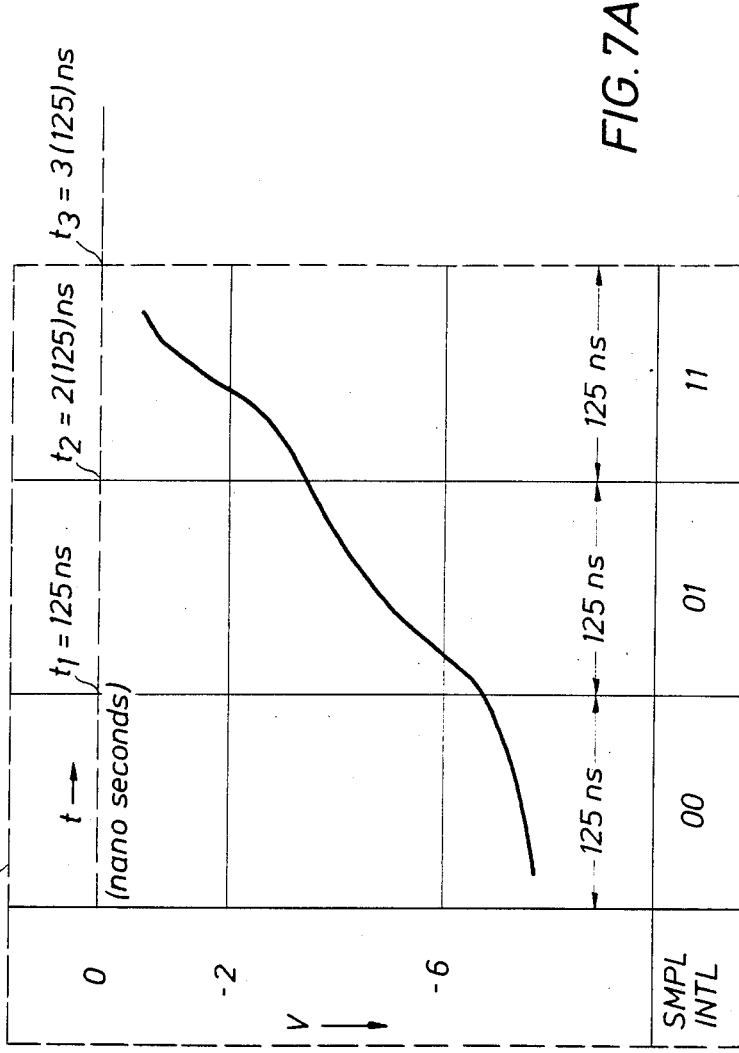
FIGS. 7a and 7b, illustrates a construction of the FMD hardware shown in FIG. 6, this figure demonstrating the function of the FMD hardware in generating threshold or zero crossing data.
Figure 7B:
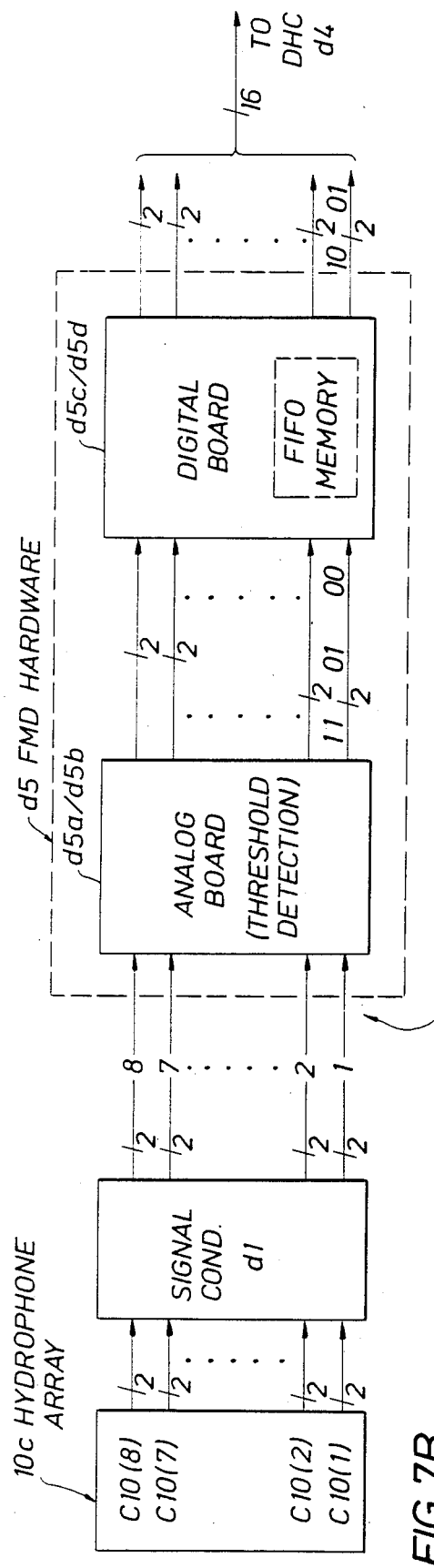

Referring to FIGS. 7a and 7b, a construction of the actual implementation of the FMD hardware d5 shown in FIGS. 5 and 6 is illustrated. Furthermore, inputs to and outputs from each block of FIG. 7b, for one channel, are set forth in the drawing for purposes of assisting in a description of the functional operation of the FMD hardware d5.

In FIG. 7b, the FMD hardware d5 comprises an analog board d5a/d5b and a digital board d5c/d5d. The receiver 10c, or hydrophone array, portion of the well tool contains, in the preferred embodiment, eight hydrophone sets, each hydrophone set being identified by its element numeral C10. Since each hydrophone set generates an analog waveform representing a compressional wave propagating in the formation, there are eight analog outputs from the hydrophone array 10c, each analog output corresponding to one hydrophone set C10. Each of the eight analog outputs, 1 through 8, are connected to the analog board of the FMD hardware d5. There are two outputs from the analog board corresponding to each input to the analog board from a hydrophone set C10, the two outputs carrying a two-bit digital code. Since there are eight inputs to the analog board, there are sixteen (16) outputs from the analog board. Therefore, eight two-bit digital codes, or a 16-bit word, is output from the analog board and input to the digital board. A corresponding 16-bit word is output from the digital board and input to the DHC d4.

In the following paragraph, let us examine the events transpiring within one channel of the FMD hardware (one hydrophone set C10 analog waveform output) and discuss how this one analog waveform output is converted, by the analog board, into three sequentially generated two bit digital codes, and, further, how these three sequentially generated two bit digital codes are further converted, by the digital board, into two sequentially generated two bit digital codes.

Assume that the output analog waveform generated by hydrophone set C10(1) and input to the analog board on line 1, in FIG. 7b, is the waveform shown in FIG. 7a of the drawings. Examining FIG. 7a, the X-axis represents time "t", and the Y-axis represents voltage "V". There are two threshold lines, an upper threshold line at $V=-2$ and a lower threshold line at $V=-6$. The waveform and the two threshold lines of FIG. 7a are illustrated for purposes of illustration only, since thresholds in general are independently enabled and the waveform of FIG. 7a could also be a downwardly directed waveform in lieu of the upwardly directed waveform as illustrated in FIG. 7a. A first sampling interval ends at t1=125 nanoseconds (ns). A second sampling interval ends at t2=2(125) ns. A third sampling interval ends at t3=3(125) ns. For each sampling interval, a sampling interval code (SMPL INTL CODE) is generated. In FIG. 7a, three sampling interval codes are generated, one for each sampling interval. The three sampling interval codes are shown in FIG. 7b on the two-bit digital code line 1, in sequential order, extending between the analog board and the digital board. The digital board processes the three sampling interval codes. When the digital board completes the processing of the three sampling interval codes, two sequentially generated two bit digital codes are the result. In FIG. 7a, for the first sampling interval, the analog waveform is moving upwardly, but it does not cross either threshold line. Since the upper threshold line (V=−2) was not crossed, a "0" is assigned to the first bit position of the sampling interval code, and since the lower threshold line (V=−6) was not crossed, a "0" is assigned to the second bit position of the sampling interval code. Therefore, the sampling interval code for the first sampling interval is "00". For the second sampling interval, the analog waveform is moving upwardly, it does cross the lower threshold line V=−6, but it does not cross the upper threshold line V=−2. Since the upper threshold line (V=−2) was not crossed, a "0" is assigned to the first bit position of the sampling interval code, but since the lower threshold line (V=−6) was crossed, a "1" is assigned to the second bit position of the sampling interval code. Therefore, the sampling interval code for the second sampling interval is "01". For the third sampling interval, the analog waveform is moving upwardly, it has already crossed the lower threshold line V=−6, and it does cross, during this third sampling interval, the upper threshold line V=−2. Since the upper threshold line (V=−2) was crossed, a "1" is assigned to the first bit position of the sampling interval code, and since the lower threshold line (V=−6) is still crossed, a "1" is assigned to the second bit position of the sampling interval code. Therefore, the sampling interval code for the third sampling interval is "11". As a result, the three sequentially generated sampling interval codes, sequentially generated from the analog board, are "11 01 00". These three sequentially generated sampling interval codes appear on line 1 between the analog board and the digital board. The digital board receives the three sequentially generated sampling interval codes. It reads the first code "00" and stores the first code in the memory. It reads the second code "01" and compares the second code "01" with the first code "00". The digital board compares the first bit of each code and notes that the first bit of each code is "0". Since the first bit did not change, when comparing the first and second sampling interval codes, a "0" is assigned to a new first bit position associated with the output of the digital board. However, the digital board compares the second bit of each code and notes that the second bit of the first code is "0", but the second bit of the second code is "1". Since the second bit did change, when comparing the first and second sampling interval codes, a "1" is assigned to a new second bit position associated with the output of the digital board. The first, sequentially generated output of the digital board is thus "01". The digital board reads the second sampling interval code "01" and stores the second code. It reads the third code "11" and compares the third code "11" with the second code "01". The digital board compares the first bit of each code and notes that the first bit of the second code is "0", but the first bit of the third code is "1". Since the first bit did change, when comparing the second and third sampling interval codes, a "1" is assigned to a new first bit position associated with a second output of the digital board. However, the digital board compares the second bit of each code and notes that the second bit of the second code is "1", and the second bit of the third code is also "1". Since the second bit did not change, when comparing the second and third sampling interval codes, a "0" is assigned to a new second bit position associated with the second output of the digital board. The second, sequentially generated output of the digital board is thus "10". A first generated 16 bit word, output from the digital board, is "01-------------", and a second generated 16 bit word, output from the digital board, is "10-------------". The "1" bits in each word represent the threshold crossings, and these threshold crossings are analyzed by the DFMD software, in the well logging truck computer, for determining the first arrival times of a compressional wave propagating in the borehole formation.

Figure 8:
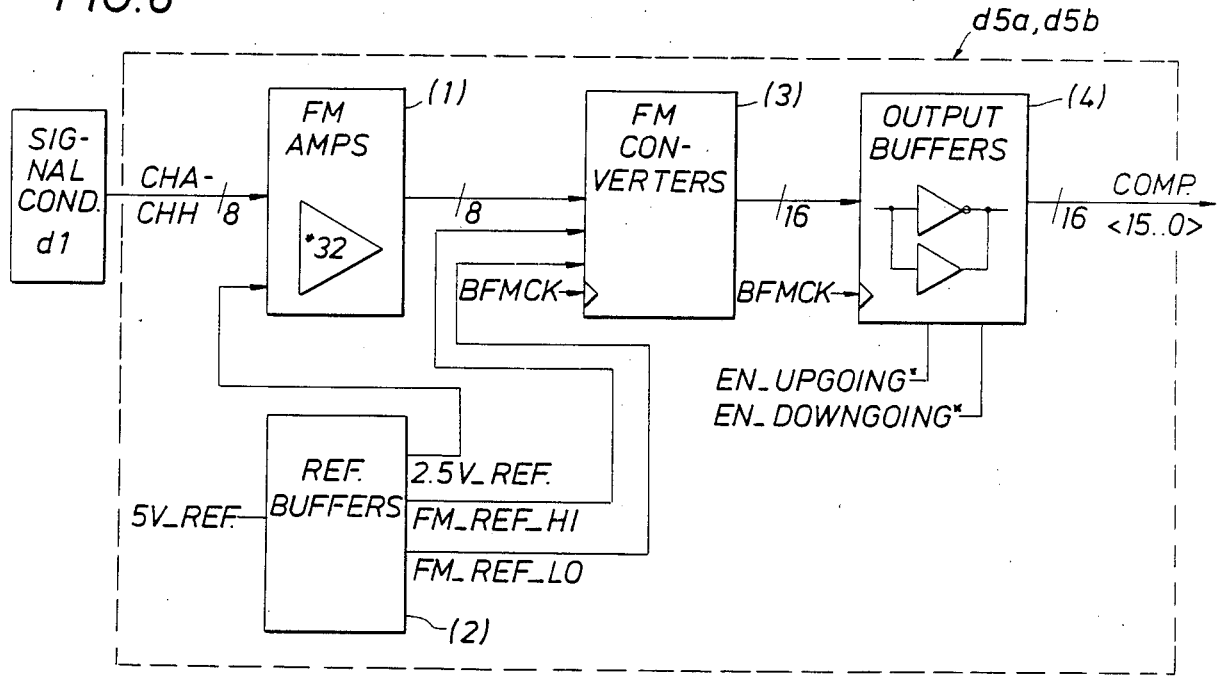
FIG. 8 illustrates a construction of the analog board of FIG. 7b.

Referring to FIG. 8, a detailed construction of the analog board d5a/d5b of FIG. 7b is illustrated.

In FIG. 8, the analog board d5a/d5b includes a set of first motion (FM) amplifiers (FM Amps) (1) responsive to outputs from the signal conditioning unit d1, there being 8 outputs from the signal conditioning unit d1, one output from each of eight hydrophone sets C10. The FM Amps (1) also receive a 2.5 volt reference signal from a set of reference buffers (2) and generates eight (8) output signals corresponding to each of the 8 outputs from the signal conditioning unit d1. The reference buffers (2) receive a 5 volt reference signal and, in addition to generating the 2.5 volt reference signal, also generates a first motion high reference (FM REF HI) and a first motion low reference (FM REF LO). A First Motion Converter (FM Converter) (3) receives each of the eight (8) output signals from the FM Amps (1), the FM REF HI signal and the FM REF LO signal from the reference buffers and, for each of the eight (8) output signals from the FM Amps (1) circuit, generates a two output signal digital code; therefore, for the eight (8) output signals, sixteen (16) output signals (eight-two output signal digital codes) are generated. An output buffers circuit (4) is connected to the output of the FM converters circuit (3) and receives the sixteen output signals from the FM converters circuit (3). The output buffers (4) determine the polarity of the eight-two output signal digital codes, received from the FM converters (3), appearing at its output, one polarity corresponding to an upgoing analog signal appearing at the input of the FM Amps (1), another polarity corresponding to a downgoing analog signal appearing at the input of the FM Amps (1).

In operation, referring to FIG. 8, eight signals, received from the signal conditioning unit d1, are received at the input of the FM Amps (1). Assume that one such signal is shown in FIG. 7a. The FM Amps amplify the signal and transmit the signal to the input of the FM converters circuit (3). The FM converters also receive the FM REF HI signal and the FM REF LO signal, as well as a clock signal (BFMCK). In response to the clock signal BFMCK, the FM converters (3)

compare the amplitude or magnitude of the signal shown in FIG. 7a at each 125 nanosecond interval increment. The amplitude of the signal of FIG. 7b during the first 125 ns interval increment is compared with the amplitude of the FM REF HI signal and with the amplitude of the FM REF LO signal. If the signal amplitude is greater than both FM REF HI and FM REF LO, a "11" is generated by the FM converter (3). If the signal amplitude is greater than the amplitude of FM REF LO, but less than the amplitude of FM REF HI, a "01" is generated by the FM converter (3). If the signal amplitude is less than the amplitudes of both the FM REF HI and the FM REF LO, a "00" is generated by the FM converter (3). In this example, a "00" is generated during the first 125 ns interval increment. A similar comparison is performed during the second, third, ..., Nth 125 ns interval increments. In this example, during the second 125 ns interval increment, a "01" is generated, and during the third 125 ns interval increment, a "11" is generated. The digital codes "00", "01", and "11" are stored in the output buffers (4). The output buffers (4) are receiving the "EN upgoing" pulse, or the "EN downgoing" pulse. The polarity of the digital codes ("00", "01", "11") generated by the output buffers (4) is determined by the state of the pulses "EN upgoing" and "EN downgoing". If, for example, the EN Upgoing pulse is a "1", the digital codes will appear at the output of the output buffers (4) in the following sequence: 00, 01, 11. But, if the EN downgoing pulse is a "1", the digital codes will appear at the output of the output buffers (4) in the following sequence: 11, 10, 00.

Referring to FIG. 9, a detailed construction of the digital board d5c/d5d is illustrated.

In FIG. 9, the digital board includes an upper threshold portion (5) and a lower threshold portion (6), the upper threshold portion (5) including a latch circuit (5a) and an AND gate (5b), the lower threshold portion (6) including a similar such latch circuit (6a) and AND gate (6b). The outputs of the upper threshold portion (5) and the lower threshold portion (6) are each connected to a data input (D) of a first in first out memory (8), and to the inputs of an OR gate (7). The output of the OR gate (7) is connected to a write-enable (wr) terminal of the first in first out high speed memory (8). The output of the OR gate (7), in addition to being connected to the write enable terminal of memory (8), is also connected to the write enable terminal of another first in first out memory (9). The data (D) input terminal of memory (9) is connected to a counter (10), such that, when data is written into memory (8), a count, corresponding to a time reference, is written into memory (9).

In operation, referring to FIG. 9, the digital board receives the output from the analog board. Using the example of FIGS. 7a and 7b, the analog board generates the following digital codes, associated with the output of the first hydrophone set C10(1), during the first three 125 nanosecond interval increments, in the order noted in FIG. 7b: 11 01 00. The first digit of a digital code represents the "upper" threshold digit and the second digit of the digital code represents the "lower" threshold digit. Therefore, the first digit of the digital code is input to latch circuit (5a) and to AND gate (5b). The second digit of the digital code is input to latch circuit (6a) and to AND gate (6b). A previous sample digit already appears at the output of latch circuit (5a) marked "previous sample" representing the complement of a previous upper threshold digit, and a previous sample digit already appears at the output of the latch circuit (6a) marked "previous sample" representing the complement of a previous lower threshold digit. In our example, if the digital code appearing at the input of the digital board is "01", "0" is the upper threshold digit being input to latch circuit (5a) and "1" is the lower threshold digit being input to the latch circuit (6a). The digital code "00" was previously input to the digital board; thus, "0" is already appearing on the output of latch circuits (5a) and (6a) marked "previous sample". As will be noted below, when the "time gate" and "upper threshold enable" inputs to AND gates (5b) and (6b) are at their proper levels, the AND gates (5b) and (6b) will not generate a positive output unless the previous sample is different than the current threshold sample. Using our example again, "00") was the previous sample. Therefore, previous sample (complement) is "11"; a "1" appears at the output of latch circuit (5a) and (6a), being input to AND gate (5b) and (6b). Since "01" appears at the input to the digital board as the current sample, the "1" is input to latch circuit (6a) and is also input to AND gate (6b) on line 1, but a "0" is input to the latch circuit (5a) and to AND gate (5a). "Previous sample" (complement) is a "1" on line 2, input to AND gates (5b) and (6b). Assuming lines 3 and 4 are also a "1", the AND gate (6b) generates an output signal to OR gate (7), but AND gate (5b) fails to generate an output signal, since line 1 of AND gate (5b) is a "0". Therefore, the write enable terminal of first in first out (FIFO) memory (8) is enabled, and the write enable terminal of the memory (9) is also enabled. The output of AND gate (6b), which is a "1", is written into memory (8) and, simultaneously, the count of counter (10) is also written into memory (9). In our example, the write operation occurred in the memory (8) when the previous sample of the lower threshold (a "0") was different than the current sample of the lower threshold (a "1"); in addition, the time when the write operation took place was simultaneously recorded from counter (10) into memory (9). Furthermore, the digital board of FIG. 9 distinguishes a downgoing analog curve from an upgoing analog curve in the following manner: if the current sample is a "0" (a minus) and the previous sample is a "1" (a plus), the "0" (a minus) represents a downgoing analog curve; whereas, if a current sample is a "1" (a plus) and the previous sample is a "0") (a minus), the "1") (a plus) represents an upgoing analog curve. By selecting the polarity of the 16 bit word that is input to the digital board, upgoing analog curves may be distinguished from downgoing analog curves.

FIG. 10 represents a timing diagram of the digital board illustrated in FIG. 9.

A detailed discussion of the First Motion Detection Processing System disposed in the well logging truck, including a discussion of the Digital First Motion Detection software, stored in the memory of the truck computer, will be set forth in the following paragraphs.

Referring to FIG. 11a, a well logging truck is disposed at a well surface, the truck containing a computer 12 which stores therein the Digital First Motion Detection (DFMD) software, in accordance with another aspect of the present invention. The truck is connected to a sonic well tool 10 disposed in a borehole. The sonic well tool of FIG. 11a is described in other co-pending applications set forth below, the disclosures of which are incorporated by reference into this specification: "Sonic Well Logging Tool Longitudinal Wave Attenuator", Ser. No. 220,777, filed July 18, 1988, now U.S. Pat. No. 4,872,526; "Sonic Well Logging Tool Transmitter", Ser. No. 243,852, filed Sept. 13, 1988, now U.S. Pat. No. 4,862,991; "A Sonic Well Tool Transmitter and Receiver Array Including an Attenuation and Delay Apparatus", Ser. No. 325,405, filed Mar. 17, 1989; and "A Method and Apparatus for Correcting a Shear Wave Slowness Estimate from a Sonic Well Tool and Producing an Output Medium reflecting a True Value of Shear Wave Slowness", Ser. No. 361,609, filed June 5, 1989.

Referring to FIG. 11b, a more detailed construction of the computer 12 of FIG. 11a is illustrated. The computer 12 used in association with the preferred embodiment comprises one of the following computers manufactured by Digital Equipment Corporation (DEC), Maynard, Mass.: (1) DEC VAX 8650, (2) DEC PDP-11; or (3) DEC VAXSTATION III. In FIG. 11b, computer 12 includes a system bus 12a to which is connected a processor 12b, a graphics film recorder 12c for generating a log 14 similar to the log illustrated in FIG. 21, and a memory 12d in which is stored the Digital First Motion Detection (DFMD) software in accordance with a second aspect of the present invention. In operation, the processor 12b executes the instructions of the DFMD software stored in memory 12d and, in conjunction with another algorithm, the recorder 12c generates the log 14, similar to that shown in FIG. 21. When the processor 12b completes execution of the DFMD software, the processor 12b stores in memory 12d the first arrival times, at each hydrophone set C10 of receiver 10c, of a compressional wave propagating along a formation in the borehole adjacent the receiver 10c of the sonic well tool. The separate algorithm converts these first arrival times to compressional wave slowness figures for creation of log 14.

Figure 12:
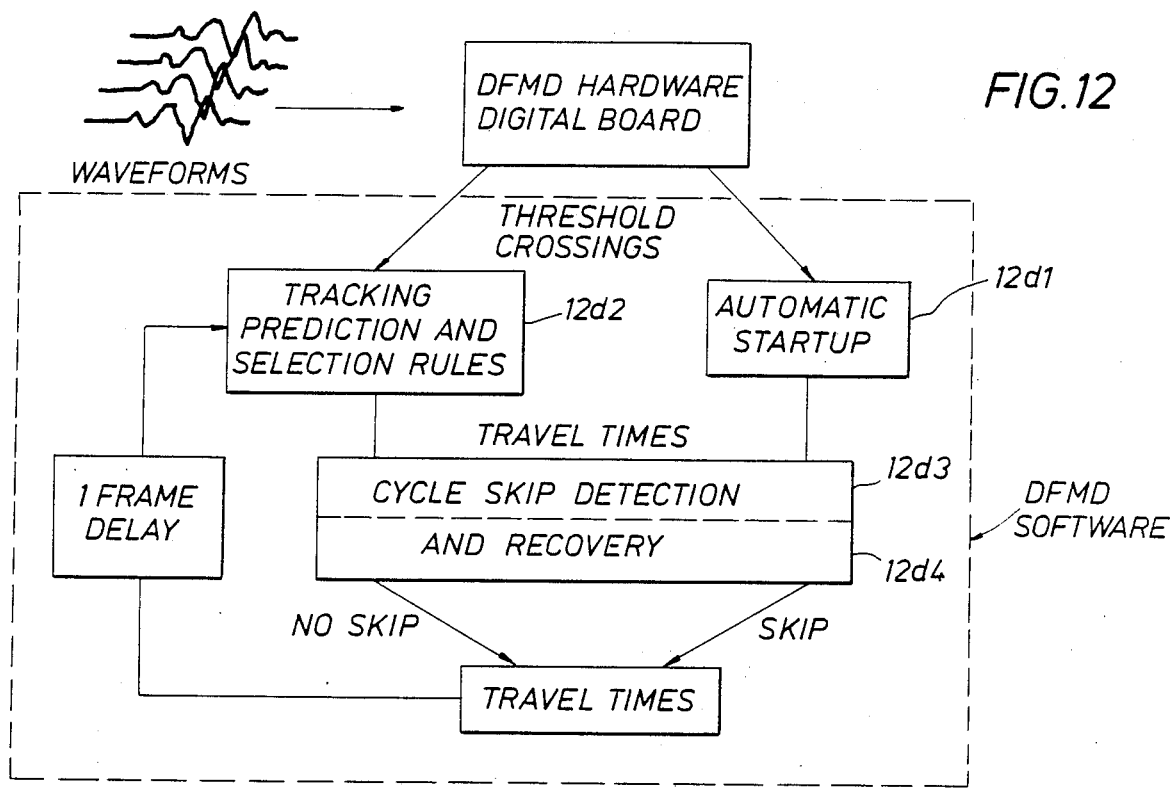
FIG. 12 illustrates a flow chart of the DFMD software stored in the well logging truck computer as shown in FIGS. 11a and 11b.

Referring to FIG. 12, a flow chart of the Digital First Motion Detection (DFMD) software stored in memory 12d is illustrated. In FIG. 12, the DFMD software comprises an automatic startup routine 12d1, a tracking routine 12d2 which inherently includes prediction and selection, a cycle skip detection routine 12d3 responding to an output from both the automatic startup routine and the tracking routine, and a cycle skip recovery routine 12d4 responding to an output from the cycle skip detection routine. The startup routine 12d1 responds to the threshold crossings generated by the digital board d5c/d5d and generates a first arrival time of a compressional wave at each receiver (C10) R1, R2, R3, and R4. The tracking routine 12d2 predicts four first arrival times using four different prediction methods; using a voting procedure, it chooses one of the four arrival times; and it generates the chosen arrival time. The cycle skip detection routine 12d3 determines if the arrival time from either the tracking routine 12d2 or the startup routine 12d1 "cycle skips" (i.e., if either arrival time is outside an expected, anticipated range, which range is based on prediction and experience). The cycle skip recovery routine 12d4 determines if the arrival times from either routine 12d1 or 12d2 continue to cycle skip; if it does, it reports "novalue" to the output, otherwise, it uses the tracking routine arrival time if such arrival time does not cycle skip (is not outside the anticipated range) and uses the startup routine arrival time if the tracking arrival time does cycle skip (is outside the anticipated range). Each of the software routines 12d1 through 12d4 will be discussed in more detail later in this specification.

Figure 13:
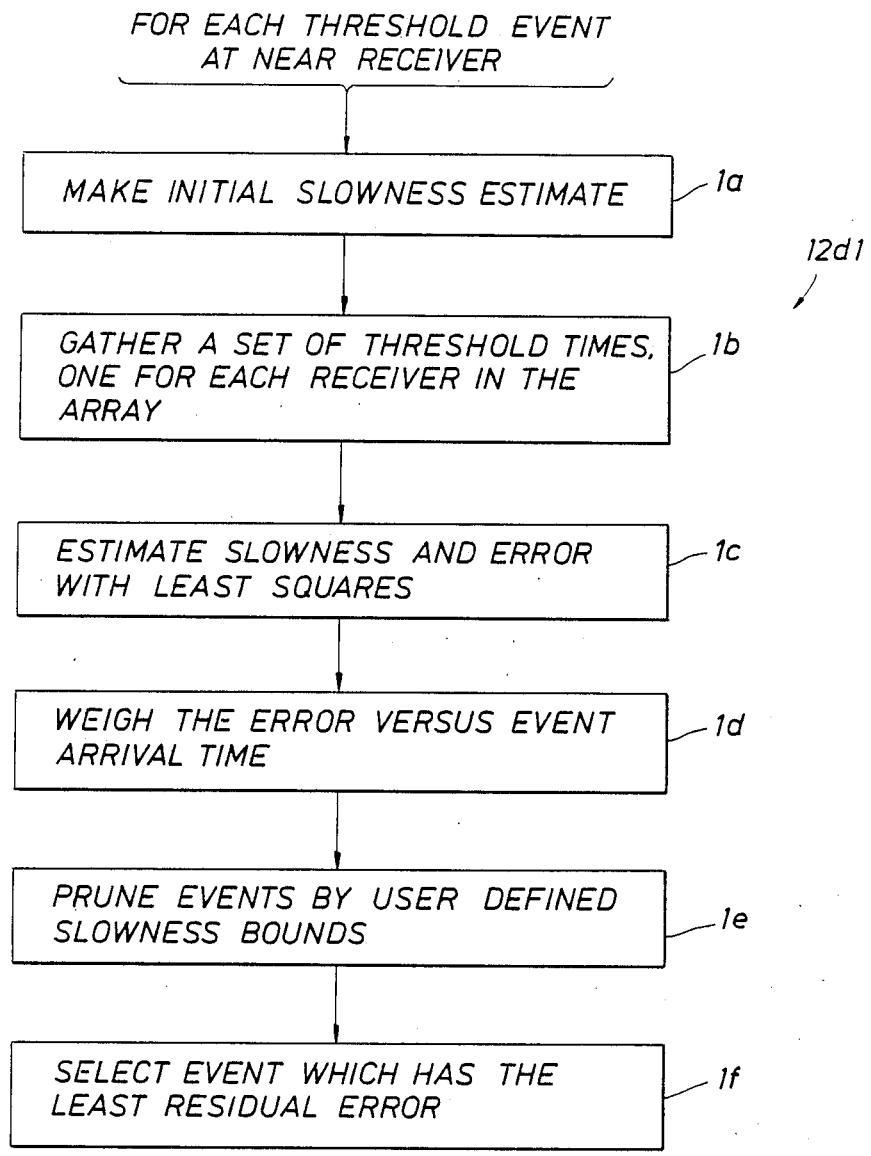

Referring to FIG. 13, a flowchart of the automatic startup routine 12d1 of FIG. 12 is illustrated. In FIG. 13, the automatic startup routine begins by making an initial slowness estimate for each threshold event at a near receiver, block 1a. A threshold event is defined as being a zero or threshold crossing. A set of threshold times are gathered, one for each receiver in the receiver array, block 1b. From the initial slowness estimates and the set of threshold times, slowness is estimated; an error function is also estimated using a least squares technique, block 1c. The error is weighed versus event arrival time, block 1d. The events are pruned by user defined slowness bounds, block 1e. An event is selected which has the least residual error, block 1f.

Figure 14:
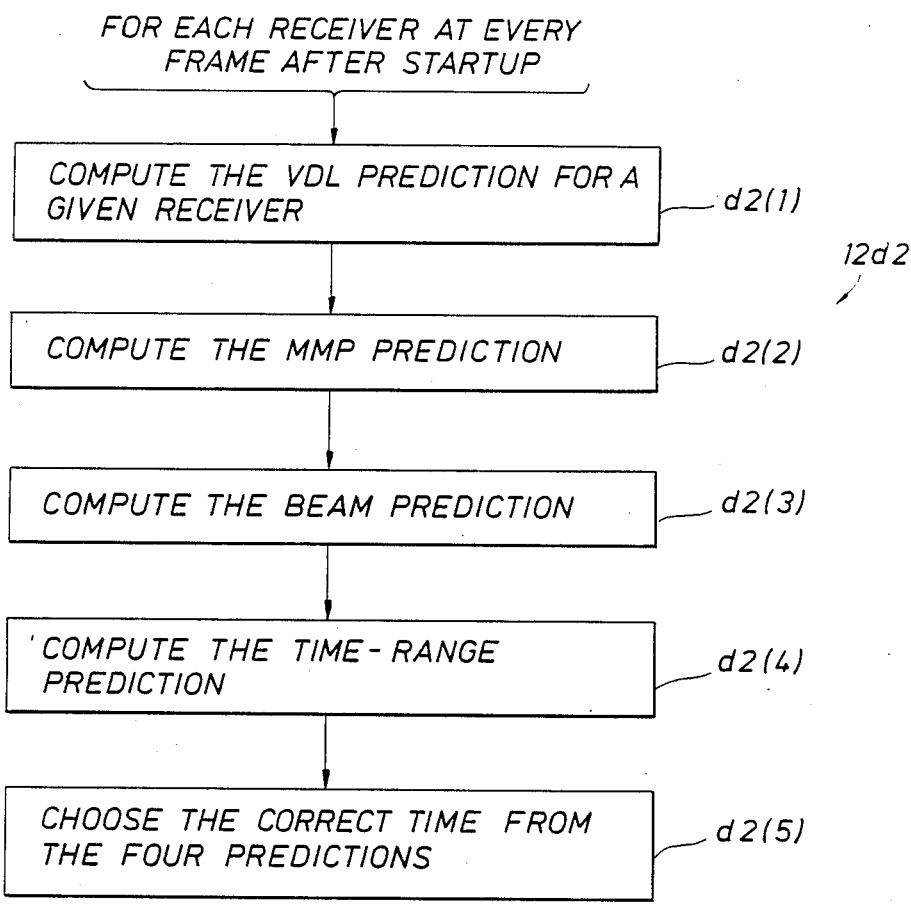

Referring to FIG. 14, a flowchart of the tracking, prediction and selection routine 12d2 is illustrated. This routine involves performing several different types of predictions: a Variable Density Log (VDL) prediction, block d2(1), a Multi-Measurement Prediction (MMP), block d2(2), the Beam Forming prediction, block d2(3), and the Time Range prediction, block d2(4). Each of these predictions will be discussed in more detail later in this specification. Following the performance and implementation of each of these predictions, the tracking, prediction and selection routine 12d2 chooses the correct time from the four predictions, block d2(5).

Figure 15:
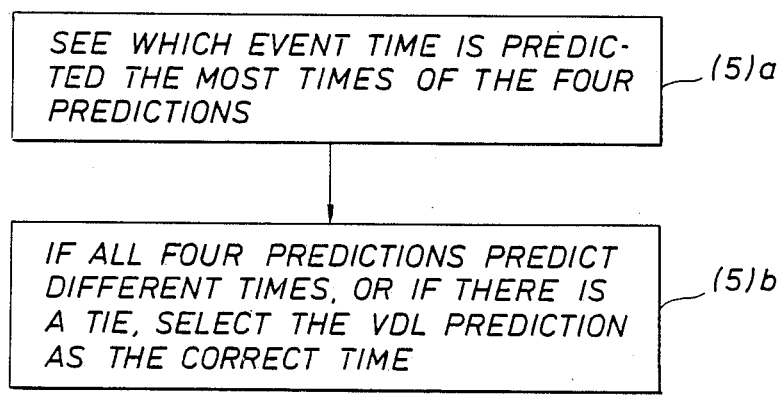

Referring to FIG. 15, a flowchart of block d2(5) of FIG. 14 is illustrated, this flowchart defining how the routine 12d2 chooses the correct time from the four above referenced predictions. In FIG. 15, in order to choose the correct time from the four different prediction methods referenced in FIG. 14, first determine which event time is predicted the most number of times from each of the four predictions and choose that particular event time as the compressional wave arrival time, block (5)a. If all four predictions predict different times, or if there is a tie, select the VDL prediction as the correct time, block (5)b.

Figure 16:
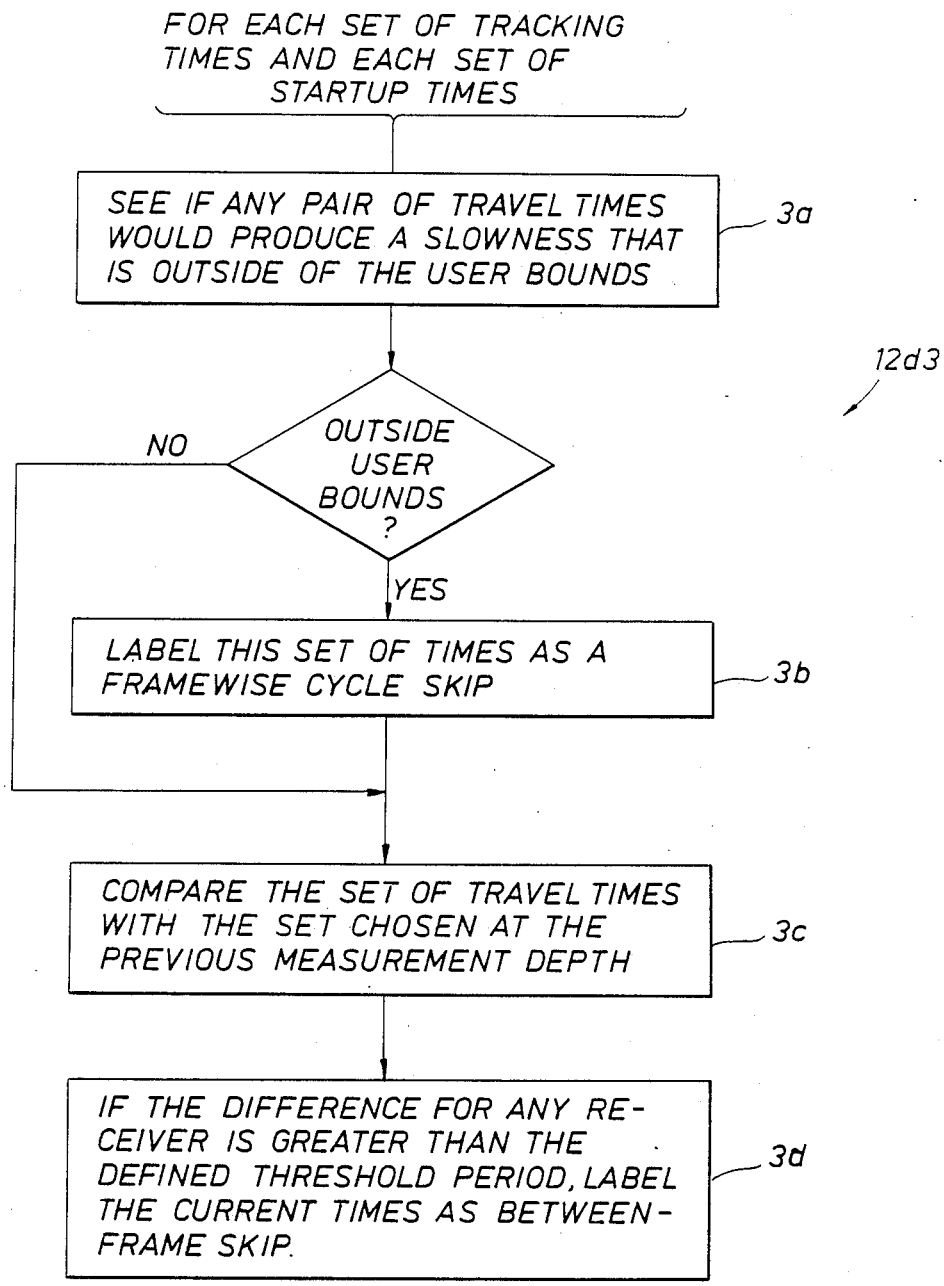

Referring to FIG. 16, a flowchart of the cycle skip detection routine 12d3 is illustrated. In FIG. 16, for each set of tracking times and each set of startup times, the cycle skip detection logic 12d3 first determines if any pair of travel times would produce a slowness that is outside of the user bounds, block 3a. If it is, label this set of times as a "framewise cycle skip", block 3b and proceed, otherwise, refrain from labelling this set of times as a "framewise cycle skip" and proceed to the next step. The logic then compares the set of travel times with the set chosen at the previous measurement depth, block 3c; if the difference for any receiver is greater than the defined threshold period, label the current times as "between frame skip", block 3d.

Figure 17A:
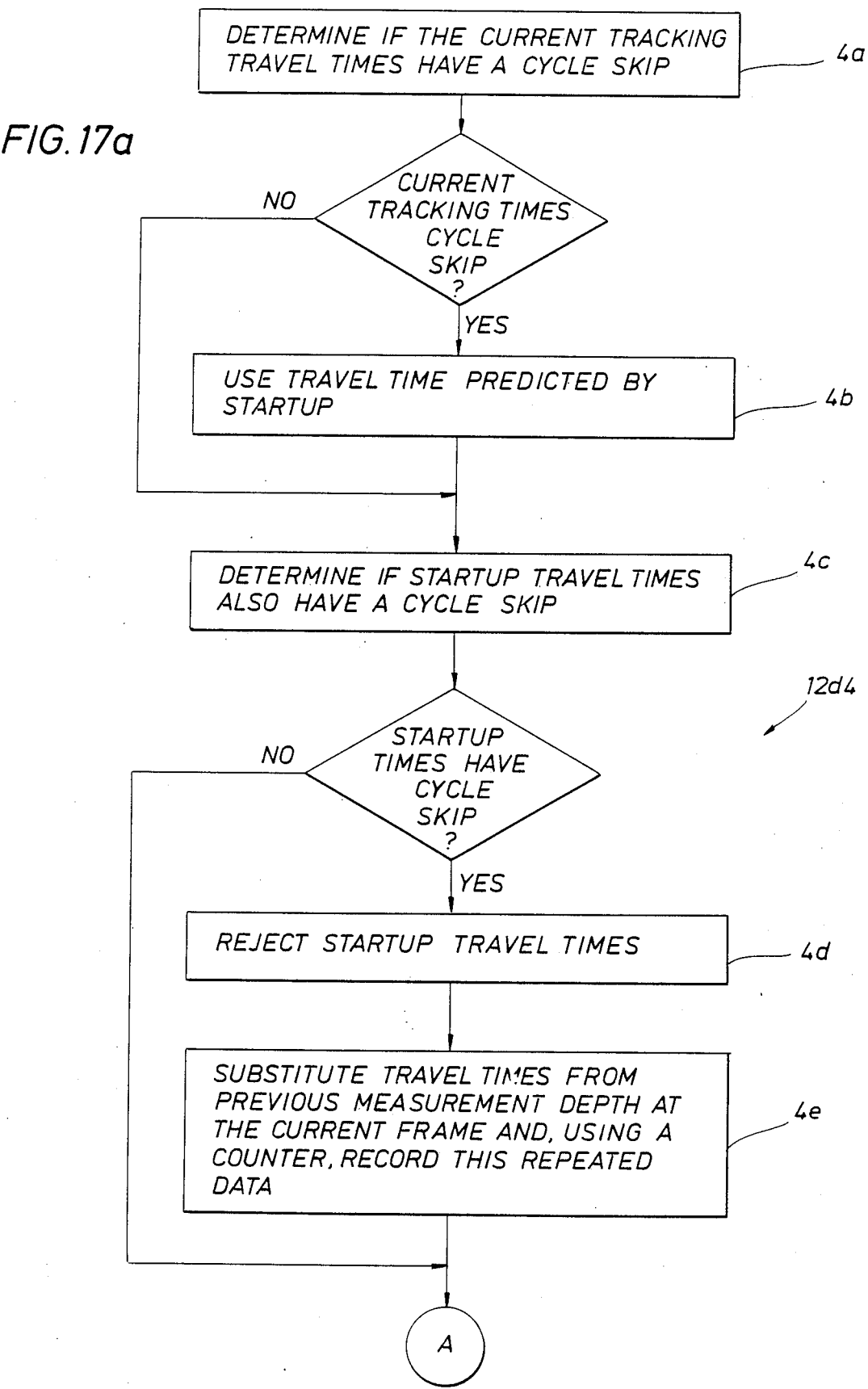
Figure 17B:
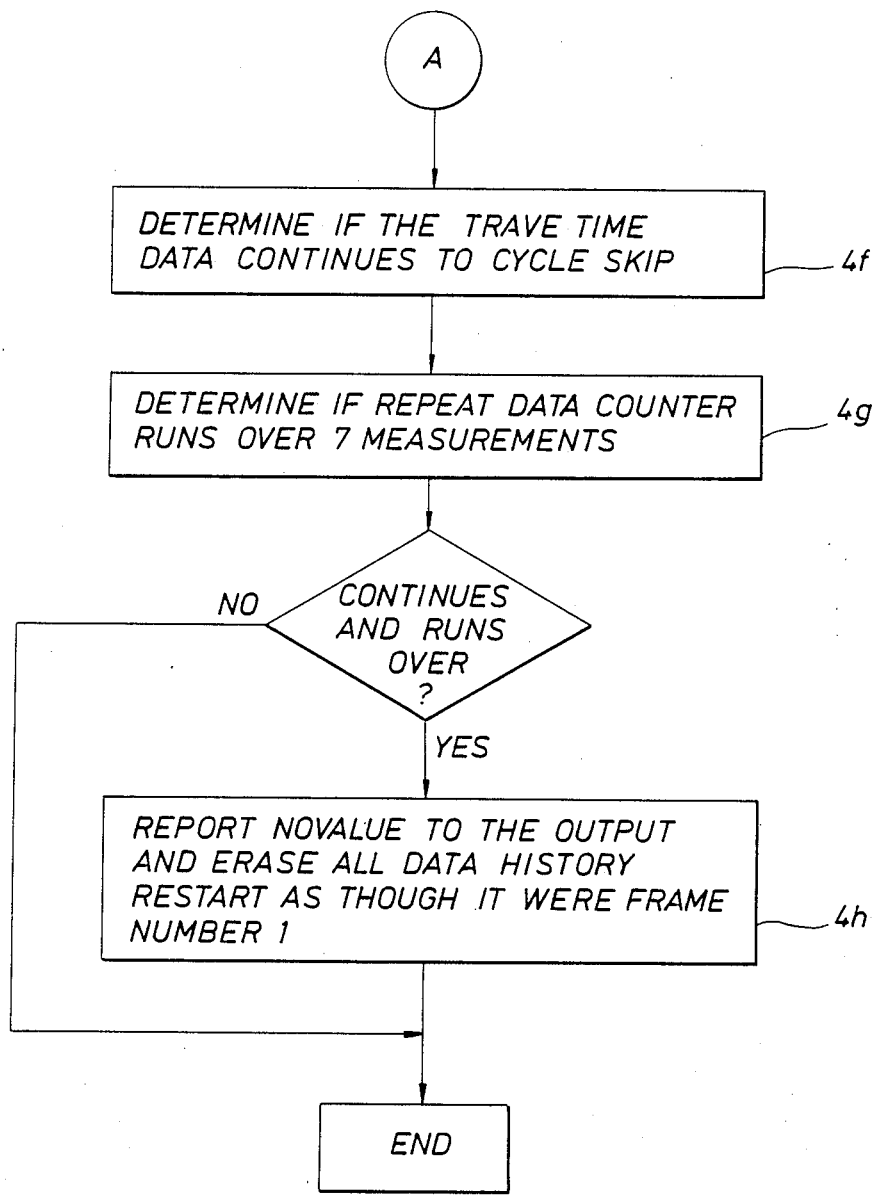

Referring to FIGS. 17a–17b, a flowchart of the cycle skip recovery routine 12d4 is illustrated. The cycle skip recovery routine first determines if the current tracking times have a cycle skip (either framewise cycle skip or between frame skip, as discussed above), block 4a. If the times do have a cycle skip, use the travel times predicted by the automatic startup routine, block 4b; if not, do not use the startup travel times. Then, determine if the automatic startup routine travel times also have a cycle skip, block 4c. If the startup travel times do have a cycle skip, reject the startup travel times, block 4d, and substitute the travel times from the previous measurement depth at the current frame and, using a counter, record this repeated data, block 4e; otherwise, do not reject startup travel times and do not substitute travel times as mentioned hereinabove, and proceed to the next step. Determine if the travel time data continues to cycle skip, block 4f. Determine if the repeat data counter runs over 7 measurements, block 4g. If the travel time data continues to cycle skip, and if the repeat data counter runs over 7 measurements, report NO-VALUE to the output, erase all data history, and restart as though it were frame number 1, block 4h; otherwise, if travel time data does not continue to cycle skip and if repeat data counter does not run over 7 measurements, end.

The following paragraphs set forth a general discussion of the function performed by the computer system 12 of FIG. 11b when executing the DFMD software stored in memory 12d.

As a general rule, the DFMD software includes four parts: (1) Automatic Start-up, (2) Tracking which inherently includes Prediction and Selection, (3) Cycle Skip Detection, and (4) Cycle Skip Recovery. A discussion of the function performed by each of these four parts of the DFMD Software, when executing in the computer system 12 of FIG. 11b will be set forth in the following paragraphs.

(1) Automatic Start-up routine 12d1

Figure 18:
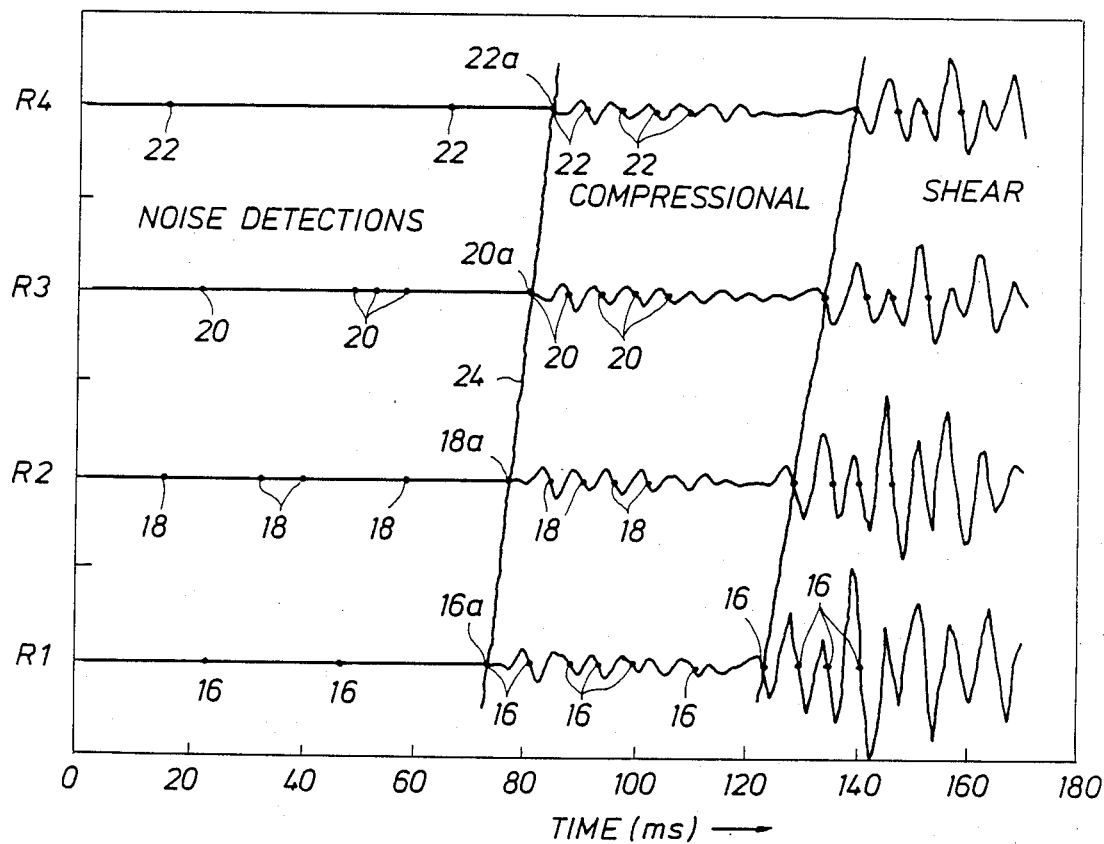

Referring to FIG. 18, four sets of dots (threshold crossings) are shown in an X-Y coordinate system, where the Y-axis represents four hydrophone sets C10 or "receivers" (R1, R2, R3, and R4) and the X-axis represents the number of samples of the received analog waveform from each hydrophone set R1, . . . , R4. Recall, in FIG. 6 and 7, that samples of the received analog waveform were taken, one sample each 125 nano-seconds. In FIG. 18, a hypothetical situation is presented wherein 1.8 ms of each analog waveform was sampled by the FMD hardware d5, one sample each 125 ns. When the 1.8 ms of data is sampled, by the FMD Hardware d5, for each hydrophone set R1, . . . , R4, threshold crossing data is generated, the threshold crossing data being sent uphole to the computer 12 and being represented by the dots adjacent the hydrophone sets R1, R2, R3, and R4 on the Y-axis of FIG. 18. For example, in FIG. 18, dots 16 represent threshold crossings associated with hydrophone set (C10) R1 transmitted uphole from the digital board of FMD hardware d5 via the DTS 10e; dots 18 represent threshold crossings associated with hydrophone set (C10) R2 transmitted uphole from the digital board of FMD hardware d5 via the DTS 10e; dots 20 represent threshold crossings associated with hydrophone set (C10) R3 transmitted uphole from the digital board of FMD hardware d5 via the DTS 10e; and dots 22 represent threshold crossings associated with hydrophone set (C10) R4 transmitted uphole from the digital board of FMD hardware d5 via the DTS 10e. Imagining for a moment that only the dots 16, 18, 20, 22 are received by the computer 12 from each receiver R1, . . . , R4, after executing the DFMD software, the computer 12 locates the first straight line 24, on the X-axis, which passes through (or nearly passes through) four dots 16a, 18a, 20a, and 22a associated with hydrophone sets R1 through R4. If a straight line 24 passes through all four dots 16a, 18a, 20a, 22a, it is presumed that the dots which follow straight line 24 represent threshold crossings associated with compressional wave data, and the dots which precede the straight line 24 represent threshold crossings associated with noise detections. If dots 16a, 18a, 20a, and 22a are known, the first arrival times (alternatively, travel times) associated with the compressional wave at each receiver R1, . . . , R4 are also known, since each dot is associated with a specific travel time. If a travel time $S_n(1)$ is known for dot 16a, and a travel time $S_n(2)$ is known for dot 18a, the difference between $S_n(2)$ and $S_n(1)$ represents the travel time taken in the formation for the compressional wave to propagate between receiver R1 and receiver R2. Similarly, if a travel time $S_n(3)$ is known for dot 20a, the difference between $S_n(3)$ and $S_n(1)$ represents the travel time taken in the formation for the compressional wave to propagate between receiver R1 and receiver R3. If a travel time $S_n(4)$ is known for dot 22a, the difference between $S_n(4)$ and $S_n(1)$ represents the travel time taken in the formation for the compressional wave to propagate between receiver R1 and receiver R4. Given known distances or spacings "TR(r)" between a sonic transmitter and each receiver "r" (each of the receivers R1-R4), the following relationship allows us to calculate a slowness "delta T(n)" as a function of the distance between receiver "r" and receiver "1" (TR(r)-TR(1)) and each difference in travel time between the receiver "r" and receiver "1" ($S_n(r)-S_n(1)$):

$$\Delta T(n) \frac{\sum_{r=2}^{NR} (S_n(r) - S_n(1))^2}{\sum_{r=2}^{NR} (S_n(r) - S_n(1))(TR(r) - TR(1))}$$

Sometimes, a straight line will not pass precisely through all four dots 16a, 18a, 20a, 22a, in that one or more of the dots will not lie on the straight line. In this case, for each straight line similar to line 24 in FIG. 18, a residual travel time error E(n) is assigned to the straight line, the residual travel time error E(n) being proportional to the degree to which its straight line fits the four points 16a-22a and being calculated in accordance with the following equation, which equation is also a function of the difference in travel time between the receiver "r" and receiver "1" ($S_n(r)-S_n(1)$), the distance between receiver "r" and receiver "1" (TR(r)-TR(1)), and the slowness "delta T(n)", calculated hereinabove:

$$E(n) = \sum_{r=1}^{NR} \sqrt{[S_n(r) - (S_n(1) + \Delta T(n) \times (TR(r) - TR(1)))]^2}$$

Furthermore, some straight lines, like line 24, appear early in time (fewer number of samples), and some lines appear later in time (larger number of samples). The straight line appearing earliest in time is the desired line to represent first arrival time of a compressional wave. Consequently, another error function Ew(n), otherwise termed "weighting function" Ew(n), is calculated, the weighting function Ew(n) being directly proportional to the degree to which a particular straight line appears later along a time axis:

$$EW(n) = E(n) + t(n)/W,$$

where W=100, E(n) is the residual travel time error computed above, and t(n) is the particular time under scrutiny where the straight line in question appeared on a time axis The event (the straight line) which has the least residual travel time error E(n), after applying the weighting function Ew(n) (arrives earliest in time), is assumed to be the event corresponding to the correct compressional arrival. The slowness associated with this correct compressional arrival is plotted on a log, similar to the log shown in FIG. 21.

The previous section described how the startup routine made the initial estimate which begins the algorithm, and how this estimate can be made at every depth as an estimate of the final answer (travel time and slowness). The next section describes the concept of "Tracking", whereby we use the measurement redundancy of the system to predict the answer at the current depth based on answers at the previous depths.

Figure 19:
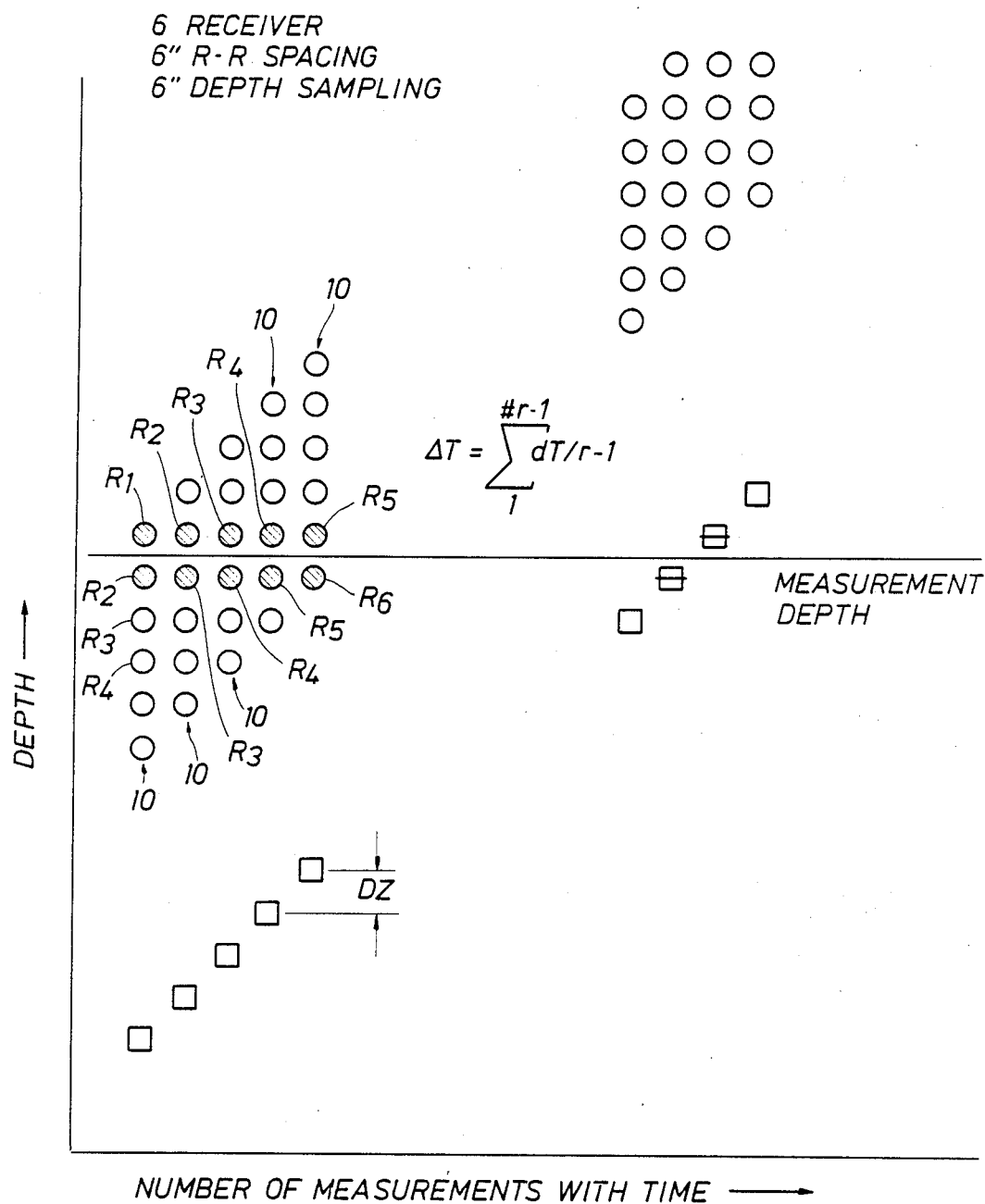

Referring to FIG. 19, a sketch of depth vs number of measurements with time is illustrated, the sketch depicting the sonic tool disposed at five consecutive positions within the borehole.

In FIG. 19, a sonic well tool 10 having six hydrophone sets C10, or receivers, R1, ..., R6, as shown in FIG. 2, is disposed at five (5) separate positions within a borehole. At a first position in the borehole, with reference to a "measurement depth", hydrophone sets C10, or "receivers", R1 and R2 are disposed adjacent the measurement depth. At a second position in the borehole, receivers R2 and R3 are disposed adjacent the measurement depth. At a third position in the borehole, receivers R3 and R4 are disposed adjacent the measurement depth. At a fourth position in the borehole, receivers R4 and R5 are disposed adjacent the measurement depth. At a fifth position in the borehole, receivers R5 and R6 are disposed adjacent the measurement depth. Note that the portion of the formation at the measurement depth is measured or logged five times, once for each separate position of the sonic tool 10 in the borehole. When the tool is disposed at the first position in the borehole, assume the difference between compressional wave arrival times at receivers R1 and R2 is "Sn(1)-Sn(2)". Accordingly, when the tool is disposed at the second through fifth positions in the borehole, the difference between compressional wave arrival times for receiver combinations R2/R3, R3/R4, R4/R5, & R5/R6 at the measurement depth is as follows:

| Position | Receivers | arrival time difference |
|---|---|---|
| 1 | R1 and R2 | Sn(1)-Sn(2) |
| 2 | R2 and R3 | Sn(2)-Sn(3) |
| 3 | R3 and R4 | Sn(3)-Sn(4) |
| 4 | R4 and R5 | Sn(4)-Sn(5) |
| 5 | R5 and R6 | Sn(5)-Sn(6) |

Therefore, when the tool 10 has completed its determination of the compressional wave arrival time differences for each of the receiver combinations R1/R2, R2/R3, R3/R4, R4/R5, & R5/R6, and when each of the receiver combinations are disposed at the measurement depth of the borehole, an average compressional wave arrival time difference "Sn(average)" associated with that portion of the formation adjacent the measurement depth is expressed by the following relation:

$$[(Sn(1)-(Sn(2)+(Sn(2)-Sn(3))+\ldots+Sn(p)-Sn(p+1)]/(r-1)$$

where p is the number of positions occupied by the tool in the borehole, and r is the number of receivers.

In this example, the number of positions "p" is five (5) and the number of receivers "r" is six (6). Thus, the average compressional wave arrival time difference within the formation at the measurement depth is the average of the individual compressional wave arrival time differences for the above referenced receiver combinations when the tool is consecutively located at different positions within the borehole. Noting our previous discussion about computation of compressional wave slowness, an average compressional wave slowness "delta T(n)[average]" is determined with knowledge of the average compressional wave arrival time difference "Sn(average)" computed above.

(2) Tracking routine 12d2

The automatic start-up routine, reference in (1) above, provided an initial estimate of slowness and arrival time at each hydrophone set C10, or "receiver", R1, ..., R4, associated with a compressional wave propagating in a formation, when the sonic well tool 10 is disposed at a particular depth in a borehole. For purposes of the following discussion, such particular depth will hereinafter be referred to as "a previous depth". When executed by processor 12b, the tracking rules associated with part (2) of the DFMD software, stored in the memory 12d of the computer system 12, attempt to locate compressional threshold events (a further estimate of compressional wave slowness and compressional wave arrival time at receivers R1-R4) at further depths in a borehole based on such initial estimate of slowness and arrival time determined when the sonic well tool was disposed at the previous depths in the borehole. Tracking inherently includes two elements:

(a) Prediction, and
(b) Selection.

It is the goal of the DFMD software system that, once the compressional wave first arrival or travel times for each of the receivers R1, ..., R4 associated with a first depth has been estimated by the startup routine, the first arrival or travel times at every subsequent depth is predicted accurately by the Tracking rules using four different prediction methods. Cycle skip recovery logic (to be described later) is utilized in the event the Tracking logic fails. The following four prediction methods determine the further estimate of the compressional arrival time, and thus compressional slowness, at a current, further depth in the borehole based on the history (the initial estimate referenced above) available by the start-up routine of the DFMD software when the tool was disposed at the previous depth. When the four compressional first arrival time predictions have been made using the four prediction methods, a selection logic selects one of the four predicted compressional first arrival times resultant from execution of the four prediction methods.

(a) Prediction

There are four prediction methods used by the DFMD software

1. Variable Density Log Prediction,
2. Multi-Measurement Prediction,
3. Beam Forming Prediction, and
4. Time Range Prediction Referring to FIG. 20, each of these prediction methods, implemented by the DFMD software when executed by computer system 12, will be discussed in detail below with reference to FIG. 20.

1. Variable Density Log (VDL) prediction

Referring to FIG. 20a, when using this prediction method, the arrival time for one receiver is examined over multiple depths of the one receiver in the borehole, the history, of the one receiver being examined to determine travel time and slowness associated with a compressional wave propagating within the formation adjacent the receiver. The VDL prediction assumes that, over depth, the arrival time of a compressional wave from one depth to another varies rather slowly compared to the period of the compressional arrival (usually 60-100 usec). The VDL prediction technique predicts the next event by fitting a straight line to the previous N events, similar to straight line 30 shown in FIG. 20a. The one receiver at the current depth is illustrated by numeral 32, and the one receiver 32 at previous depths is illustrated by numerals 32a, 32b, and 32c. Knowing the arrival time of a compressional wave at location 32c, 32b and 32a allow us to predict the arrival time of the one receiver at location 32. Expressed mathematically, given previously picked travel times (tt), we can predict the travel time TT for the current frame (f) and receiver (r) over (H) frames of history:

$$TT_{f,r} = tt_{(f-1,r)} + \Delta T_{h,r}$$

where the Least Squares best linear slope is:

$$\Delta T_{H,r} = \frac{\sum_{h=f-2}^{f-H}(tt_{h,r} - tt_{f-1,r}) \times (h - f + 1)}{\sum_{h=f-2}^{f-H}(k - f + 1)^2}$$

The final VDL time pick is the actual event closest to the predicted travel time (TT).

2. Multi-Measurement Prediction

Referring to FIG. 20b, the multi-measurement prediction (MMP) technique, for predicting a compressional arrival time, is very similar to the analysis set forth above with reference to FIG. 19 of the drawings. The MMP prediction uses the average slowness "delta T(n)[average]", that has already been computed at the measurement depth when the sonic tool was located in previous positions in the borehole, to make an estimate of the current average arrival time and current average slowness. For example, in FIG. 20b, when the sonic tool 10 was located in a first previous position 34 in the borehole, a first average slowness "delta T(n)[average 1]" was determined for the measurement depth ("meas depth") in the borehole, in accordance with calculation equations set forth above. When the tool 10 was located in a second previous position 36 in the borehole, a second average slowness "delta T(n)[average 2]" was determined for the measurement depth in the borehole. Finally, now that the tool 10 is located in a current position 38 in the borehole, a current average arrival time and a current average slowness "delta T(n)[average-current]" is predicted from the previously calculated average slownesses, delta T(n)[average 1] and delta T(n)[average 2], corresponding to positions 34 and 36 in the borehole. Thus, for frame (f) and receiver (r), if we have (H) frames of history and an array of TR spacings (TR), then:

$$TT_{f,r} = tt_{(f,r-1)} + \Delta T_{F,R} \times (TR(r) - TR(r-1))$$

where:

$$\Delta T_{f,r} = \frac{\sum_{k=1}^{NR-r} \frac{(tt_{(f-h,r+h)} - tt_{(f-h,r+h-1)})}{TR(r+h) - TR(r+h-1)}}{NR - r}$$

The MMP Prediction is only valid when the Receiver spacing is an integer multiple of the depth sampling (or shot-to-shot spacing, DZ), and it cannot be applied to the last receiver or the first receiver in an array since there is no available history.

3. Beam Forming Prediction

Referring to FIG. 20c, the beam forming or common source prediction assumes the compressional arrival will propagate across an evenly spaced array in a linear fashion, which was the assumption made by the Automatic Start-up routine previously presented The beam forming estimate computes a least squares linear fit (delta T) to the slowness at all the previously picked (nearer) receivers, and uses this information to predict the arrival time at the current receiver (r):

$$TT_{f,r} = tt_{(f,r-1)} + \Delta T_{F,R} \times (TR(r) - TR(r-1))$$

where:

$$\Delta T_R = \frac{\sum_{r=2}^{R}(tt_{f,r} - tt_{f-1})^2}{\sum_{r=2}^{R}(tt_{f,r} - tt_{f,1})(TR(r) - TR(1))}$$

4. Time Range Prediction

Referring to FIG. 20d, the time range prediction takes advantage of the geometry of the array, this prediction looking for arrivals that occur within a time window that has boundaries established by previous picks. In FIG. 20d, all of the arrival times have been picked at the previous frame 40, and the arrival time for the previous receiver 42 has also been established. Thus, the arrival time at the current receiver can be restricted to lie within some minimum and maximum time. The current arrival time must be greater than the time at the previous receiver 42. In addition, the arrival time at the current receiver spacing (TR) cannot be larger than that of a similar spacing (TR) plus an extra bit of formation delay. The matching arrival time is obtained from the previous frame 40. Thus, for frame (f) and receiver (r), we can locate a set of times TT within the window where:

$$find\{TT\}E[tt_{f,r-1}) < TT_{f,r} < tt_{(f-1,r+1)}]$$

It is possible that a number of candidates may exist within this time range, so the time range prediction also has a set of selection rules for determining which of the times it will choose if there are more than one in the window. It does this by computing a predicted slowness for each time. Since the estimate must be biased toward earlier times, we choose the first event whose time would compute to a valid slowness. If (RR) is the given inter-receiver spacing:

$$TT_{f,r} = min_{tt}\{\Delta T_{min} < (TT_{f,r} - tt_{f,r-1})/RR < \Delta T_{max}\}$$

The time range prediction cannot be applied to the first and last receivers.

(b) Selection

Four different compressional first arrival times have been predicted by the above referenced four prediction methods. At this point, the DFMD software, when executed by the well truck computer, must choose from among these four predicted arrival times to select the correct arrival time for the compressional signal, which correct arrival time is generated from the tracking block 12d2 of FIG. 12. The correct arrival time is chosen via a voting procedure. The voting procedure algorithm is as follows:

(a) determine, for each receiver at each frame (depth) after the startup routine has completed, the event time which is predicted the most number of times from among the four predictions;

(b) the event time, for a particular receiver at a particular depth, which is predicted the most number of times is the selected compressional arrival time for that receiver at that depth;

(c) however, if all four prediction methods predict different times, or if there is a tie among the four methods, select the VDL prediction as the correct time.

The VDL prediction is selected because it is least affected by cycle skips made at other receivers.

(3) Cycle Skip Detection routine 12d3

After the selection logic has completed, the tracking portion of the DFMD software is complete. It is here that the cycle skip detection logic 12d3 of FIGS. 12 and 16 enters the execution of the DFMD software. The cycle skip detection logic 12d3 receives an arrival time from the tracking block 12d2, and it receives an arrival time from the automatic startup block 12d1; it then attempts to detect whether the arrival time from either the tracking block 12d2 or the startup block 12d1 is outside a preselected user defined bound, i.e., whether the arrival time is unacceptably different from what the DFMD software expects. If an arrival time is outside the bound (is unacceptably different from what the DFMD software expects), such arrival time is said to have "cycle skipped". There are two types of cycle skips that can occur: an interframe cycle skip and a between frame cycle skip.

More particularly, when a first arrival time at receiver R1 (e.g., one which has been predicted by one of the four above referenced prediction methods) is subtracted from a second arrival time at an adjacent receiver R2, a "delta T" or "slowness" is determined; if this "delta T" or "slowness" is outside a given range, the first arrival time is said to have "cycle skipped". Compressional arrival time slownesses range from 30 to 200 usec/ft. The interframe cycle skip detector looks at the chosen arrival for each receiver R1, ... , R4, computes the difference between arrival times (as above described) for each receiver pair (R1 and R2, R2 and R3, ... ) to form a plurality of "delta T" figures, and then determines if any computed delta T or slowness figure for any receiver pair is outside of the given range (from 30 to 200 usec/ft). If any slowness falls outside of the range, a framewise skip is detected. This can be expressed mathematically for receivers "r", travel times (TT) at a current frame or depth (f), and travel times (tt) at a previous or other frame (f) as:

$$find\{TT\}E[tt_{(f,r-1)} < TT_{f,r} < tt_{(f-1,r+1)}]$$

The arrival time for any receiver as it moves from depth to depth must vary rather slowly (<100 usec). Any travel time event for a given receiver that varies greatly from the arrival time of this same receiver at the previous depth is determined to be a between frame cycle skip. The between frame cycle skip detector looks at each receiver in the receiver array and classifies the set of times for all receivers as cycle-skipped if any individual receiver time is detected as a skip. Thus, a between frame skip is detected for any frame if there exists a receiver (r) such that:

$$(TT_{r,f} - TT_{r,f-1}) > MaxdTT$$

where the maximum allowable change in travel time between frames is MaxdTT=100 usec.

(4) Cycle Skip Recovery routine 12d4

The DFMD software has two independant estimates of compressional arrival time running simultaneously, one from the startup routine, and one from the tracking routine. The cycle skip recovery routine 12d4 decides which set to use as the final answer. If the software is running correctly, the tracking portion of the software will pick the correct arrival at each depth for each receiver without any cycle skips occuring. If a cycle skip occurs, and is detected, it may be possible to use the startup times in place of the tracking times in an attempt to recover from the skip. If the startup times are also cycle skipped, the DFMD software will "lock" for one data frame and replace all of the values at the current depth with the answers from the previous depth. The software algorithm will not allow itself to lock up for more than seven depths. After seven depths of bad data, the algorithm will report "novalue" indicating that it is lost and cannot find an acceptable set of times. At this point, the algorithm restarts as though it were at the very first depth, erasing any of its past history of bad data. The cycle skip recovery logic 12d4 is summarized below:

a. If the times from the tracking logic have cycle skipped, attempt to use the times from the automatic startup logic.

b. If the compressional first arrival time from the automatic startup routine have also cycle skipped, replace the times at the current depth with the values from the previous depth and begin the "holding" count.

c. If the holding count is greater than seven, report the default value (−999.25) and then restart the algorithm at the next frame.

The invention being thus described it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A well logging system including a well tool adapted to be disposed in a borehole traversing a formation and a computer system adapted to be disposed in a well logging truck at a surface of the borehole, said well tool including a plurality of receivers, each of the receivers generating an analog signal, comprising:

threshold crossing data generation means disposed in said well tool and responsive to the analog signals for generating a plurality of threshold crossing events for each of the analog signals, a threshold event occurring when an analog signal from a particular receiver crosses a threshold, said threshold crossing data generation means including, first means responsive to the analog signals for determining when each of the analog signals associated with each of the receivers cross a threshold and for generating a first bit when an analog signal crosses said threshold a first time and generating a second bit when the analog signal fails to cross said threshold said first time, said first means changing said first bit to a second bit when said analog signal crosses said threshold a second time and failing to change said first bit to said second bit when said analog signal fails to cross said threshold said second time, and second means responsive to the first and second bits generated in association with each analog signal by said first means for determining when a first bit changes to a second bit and when a second bit changes to a first bit, for generating another first bit when said first bit changes to said second bit or when said second bit changes to said first bit, and for generating another second bit when said first bit fails to change to said second bit or when said second bit fails to change to said first bit, a plurality of the another first bits associated with each of the analog signals representing said plurality of threshold crossing events; and first arrival time determination means disposed in said computer system and responsive to said threshold crossing events associated with each of said receivers of said well tool for determining a first arrival time at each of said receivers of a compressional wave propagating in said formation, wherein the first arrival times are used to calculate a slowness of said compressional wave, the slowness being representative of a characteristics of the formation in said borehole.

2. The well logging system of claim 1, wherein said first arrival time determination means comprises:

tracking means responsive to said threshold crossing events associated with each of said receivers for generating a first potential first arrival time representing an arrival time of said compressional wave at each of said receivers.

3. The well logging system of claim 2, wherein said first arrival time determination means further comprises:

startup means responsive to said threshold crossing events associated with each of said receivers for generating a second potential first arrival time representing an alternate arrival time of said compressional wave at each of said receivers.

4. The well logging system of claim 3, wherein said first arrival time determination means further comprises:

selection means for selecting either said first potential first arrival time or said second potential first arrival time to represent said first arrival time at each of said receivers of said compressional wave propagating in said formation.

5. The well logging system of claim 4, wherein said selection means comprises:

detection means responsive to said first potential first arrival time and said second potential first arrival time for determining a bound defining acceptable times and for determining if either said first potential first arrival time or said second potential first arrival time is outside of said bound; and recovery means responsive to the determination made by said detection means for selecting from among said first potential first arrival time and said second potential first arrival time the arrival time which is not outside said bound when either said first or said second potential first arrival time is outside said bound and for selecting said first potential first arrival time when both the first and second potential first arrival times are inside said bound.

6. The well logging system of claim 1, wherein said first arrival time determination means comprises:

startup means responsive to said threshold crossing events associated with each of said receivers for generating a first potential first arrival time representing an arrival time of said compressional wave at each of said receivers;

tracking means responsive to said threshold crossing events associated with each of said receivers for generating a second potential first arrival time representing an alternate arrival time of said compressional wave at each of said receivers; and selecting means for selecting either said first potential first arrival time or said second potential first arrival time to represent said first arrival time at each of said receivers of said compressional wave propagating in said formation.

7. The well logging system of claim 6, wherein said selecting means comprises:

detection means responsive to said first potential first arrival time and said second potential first arrival time for determining a bound and for determining if either said first potential first arrival time or said second potential first arrival time is outside of said bound; and recovery means responsive to the determination made by said detection means for selecting from among said first potential arrival time and said second potential arrival time the arrival time which is not outside said bound when either said first potential arrival time or said second potential arrival time is outside said bound and for selecting said second potential arrival time when both the first and second potential arrival times are inside said bound.

8. The well logging system of claim 1, wherein said first means generates said first bit when said analog signal crosses said threshold in a first direction and generates said second bit when said analog signal crosses said threshold in a second direction, said first means generating said second bit when said analog signal fails to cross said threshold in said first direction and generating said first bit when said analog signal fails to cross said threshold in said second direction.

9. The well logging system of claim 1, wherein:

said first means determines when each of the analog signals crosses at least a pair of thresholds and generates said first bit when an analog signal crosses a threshold a first time and generates said second bit when said analog signal fails to cross said threshold said first time, said first means changing said first bit to a second bit when said analog signal crosses said threshold a second time and failing to change said first bit to said second bit when said analog signal fails to cross said threshold said second time;

said second means responds to the first and second bits generated in association with said each threshold and determines when a first bit associated with said each threshold changes to a second bit and when a second bit associated with said each threshold changes to a first bit, said second means generates another first bit when said first bit associated with said each threshold changes to said second bit or when said second bit associated with said each threshold changes to said first bit, and generates another second bit when said first bit associated with said each threshold fails to change to said second bit or when said second bit associated with said each threshold fails to change to said first bit, a plurality of the another first bits associated with each of the analog signals when crossing said each threshold representing said plurality of threshold crossing events.

10. A threshold crossing data generation system adapted to be disposed in a well tool for generating threshold crossing data, said well tool including a plurality of receivers, each receiver developing an analog signal, comprising:
   means for sampling the analog signals from each of the receivers during a plurality of sampling intervals;
   first means responsive to the analog signals from the receivers for determining when an analog signal from each of the receivers crosses a threshold during each sampling interval and for generating a first bit when the analog signal crosses the threshold a first time and a second bit when the analog signal fails to cross the threshold said first time, said first means changing said first bit to a second bit when the analog signal crosses the threshold a second time and failing to change said first bit to said second bit when the analog signal fails to cross the threshold said second time; and
   second means responsive to the first and second bits from the first means for determining when a first bit or a second bit in one sampling interval changes to a second bit or a first bit, respectively, in an adjacent sampling interval and for generating another first bit when a change is made and for generating another second bit when a change is not made,
   the another first bits representing the threshold crossings within said threshold crossing data.

11. The threshold crossing data generation system of claim 10, wherein said first means is an analog board responsive to the analog signals from said receivers for generating the first bits and the second bits, said second means being a digital board connected to said analog board and responsive to the first bits and the second bits generated by said analog board for generating the another first bits and said another second bits.

12. A method of developing threshold crossing data in a well tool which includes a plurality of receivers, each receiver generating an analog signal, comprising the steps of:
   (a) sampling each of the analog signals during a plurality of sampling intervals;
   (b) for a particular analog signal sampled during the plurality of sampling intervals, determining if said analog signal crosses a preselected threshold within each sampling interval;
   (c) in each sampling interval, developing a first bit when the analog signal crosses said threshold a first time and developing a second bit when the analog signal fails to cross said threshold said first time, the developing step (c) further including changing said first bit to a second bit when the analog signal crosses said threshold a second time and failing to change said first bit to said second bit when the analog signal fails to cross said threshold said second time;
   (d) by comparing the first and second bits between adjacent sampling intervals, determining if a first bit changed to a second bit or if a second bit changed to a first bit;
   (e) developing another first bit if a change was made; and
   (f) developing another second bit if a change was not made;
   wherein a series of the another first bits and the another second bits comprise said threshold crossing data, the another first bits representing the threshold crossings of said threshold crossing data.

13. A well logging system including a well tool adapted to be disposed in a borehole traversing a formation and a computer system adapted to be disposed in a well logging truck at a surface of a borehole, said well tool including a plurality of receivers, each of the receivers generating an analog signal, comprising:
   threshold crossing data generation means disposed in said well tool and responsive to the analog signals for generating a plurality of threshold crossing events for each of the analog signals, a threshold crossing event occurring when an analog signal from a particular receiver crosses a threshold; wherein said threshold crossing data generation means comprises:
   first means responsive to the analog signals for determining when each of the analog signals cross a threshold and for generating a first bit when an analog signal crosses said threshold a first time and for generating a second bit when the analog signal fails to cross said threshold said first time, said first means changing said first bit to a second bit when said analog signal crosses said threshold a second time and fails to change said first bit to said second bit when said analog signal fails to cross said threshold said second time, and
   first arrival time determination means disposed in said computer system and responsive to said threshold crossing events associated with each of said receivers of said well tool for determining a first arrival time at each of said receivers of a compressional wave propagating in said formation, said first arrival time determination means including,
   startup means responsive to said threshold crossing events associated with each of said receivers for generating a first potential first arrival time representing an arrival time of said compressional wave at each of said receivers.
   tracking means responsive to said threshold crossing events associated with each of said receivers for generating a second potential first arrival time representing an alternate arrival time of said compressional wave at each of said receivers, and
   selecting means for selecting either said first potential arrival time or said second potential arrival time to represent said first arrival time at each of said receivers of said compressional wave propagation in said formation,
   wherein the first arrival times are used to calculate a slowness of said compressional wave, the slowness being representative of a characteristic of the formation in said borehole.

14. The well logging system of claim 31, wherein said selecting means comprises:
   detection means responsive to said first potential first arrival time from said startup means and said second potential first arrival time from said tracking means for determining a bound of acceptable times and determining if either said first potential arrival time or said second potential arrival time is outside of said bound; and
   recovery means for selecting from among said first potential arrival time and said second potential arrival time the arrival time which is not outside said bound when either said first potential arrival time or said second potential arrival time is outside said bound and for selecting said second potential arrival time when both said first potential arrival time and said second potential arrival time are inside said bound.

15. The well logging system of claim 13, wherein said threshold crossing data generation means further comprises:

second means responsive to the first and second bits generated in association with each analog signal by said first means for determining when a first bit changes to a second bit and when a second bit changes to a first bit, for generating another first bit when said first bit changes to said second bit or when said second bit changes to said first bit, and for generating another second bit when said first bit fails to change to said second bit or when said second bit fails to change to said first bit, a plurality of the another first bits associated with each of the analog signals representing said plurality of threshold crossing events.

* * * * *

UNITED STATES PATENT AND TRADEMARK OFFICE
CERTIFICATE OF CORRECTION

PATENT NO. : 4,985,873
DATED : January 15, 1991
INVENTOR(S) : Kevin A. Eyl et al.

It is certified that error appears in the above-identified patent and that said Letters Patent is hereby corrected as shown below:

Column 26, line 56:

Claim 14, line 1, change "31" to --13--.

Column 3, line 56, change "16(a,) 16(a,) and 16(c)" to

--1b(a), 1b(b), and 1b(c)--.

Signed and Sealed this

Fifth Day of May, 1992

Attest:

DOUGLAS B. COMER

Attesting Officer      Acting Commissioner of Patents and Trademarks